(12) United States Patent
Halder et al.

(10) Patent No.: US 11,874,671 B2
(45) Date of Patent: Jan. 16, 2024

(54) PERFORMING TASKS USING AUTONOMOUS MACHINES

(71) Applicant: SafeAI, Inc., Milpitas, CA (US)

(72) Inventors: Bibhrajit Halder, Sunnyvale, CA (US); Sudipta Mazumdar, Markham (CA)

(73) Assignee: SafeAI, Inc., Santa Clara, CA (US)

( * ) Notice: Subject to any disclaimer, the term of this patent is extended or adjusted under 35 U.S.C. 154(b) by 479 days.

(21) Appl. No.: 16/678,847

(22) Filed: Nov. 8, 2019

(65) Prior Publication Data

US 2020/0150687 A1    May 14, 2020

Related U.S. Application Data

(60) Provisional application No. 62/757,316, filed on Nov. 8, 2018.

(51) Int. Cl.
| | |
|---|---|
| *G05D 1/00* | (2006.01) |
| *G05D 1/02* | (2020.01) |
| *G08G 1/00* | (2006.01) |

(52) U.S. Cl.
CPC .......... *G05D 1/0291* (2013.01); *G05D 1/0088* (2013.01); *G05D 1/0217* (2013.01);
(Continued)

(58) Field of Classification Search
CPC .. G05D 1/0291; G05D 1/0088; G05D 1/0217; G05D 1/0219; G05D 2201/0207; G08G 1/202; G08G 1/22
See application file for complete search history.

(56) References Cited

U.S. PATENT DOCUMENTS

2006/0090378 A1    5/2006   Furem
2007/0124050 A1    5/2007   Donnelli et al.
(Continued)

FOREIGN PATENT DOCUMENTS

| WO | 2014145918 A1 | 9/2014 |
|---|---|---|
| WO | 2021050488 A1 | 3/2021 |

OTHER PUBLICATIONS

International Application No. PCT/US2019/060507, International Preliminary Report on Patentability dated May 20, 2021, 8 pages.
(Continued)

*Primary Examiner* — Truc M Do
(74) *Attorney, Agent, or Firm* — Kilpatrick Townsend & Stockton LLP

(57) ABSTRACT

The present disclosure relates generally to autonomous machines (AMs) and more particularly to techniques for intelligently planning, managing and performing various tasks using AMs. A control system (referred to as a fleet management system or FMS) is disclosed for managing a set of resources at a site, which may include AMs. The FMS is configured to control and manage the AMs at the site such that tasks are performed autonomously by the AMs. An AM may directly communicate with another AM located on the site to complete a task without requiring to be in constant communication with the FMS during the performance of the task. The FMS is configured to use various optimization techniques to allocate resources (e.g., AMs) for performing tasks at the site. The resource allocation is performed so as to maximize the use of available AMs while ensuring that the tasks get performed in a timely manner.

21 Claims, 15 Drawing Sheets

(52) U.S. Cl.
CPC .......... *G05D 1/0219* (2013.01); *G08G 1/202* (2013.01); *G08G 1/22* (2013.01); *G05D 2201/0207* (2013.01)

(56) References Cited

U.S. PATENT DOCUMENTS

| | | | |
|---|---|---|---|
| 2007/0129869 A1* | 6/2007 | Gudat | G05D 1/0297 |
| | | | 701/50 |
| 2009/0222186 A1 | 9/2009 | Jensen | |
| 2010/0094481 A1* | 4/2010 | Anderson | A01D 34/008 |
| | | | 701/1 |
| 2010/0094499 A1* | 4/2010 | Anderson | G05D 1/0295 |
| | | | 701/23 |
| 2016/0292933 A1 | 10/2016 | Sprock et al. | |
| 2018/0293498 A1 | 10/2018 | Campos et al. | |
| 2018/0319015 A1* | 11/2018 | Sinyavskiy | G06N 3/00 |
| 2019/0366538 A1 | 12/2019 | Laurent et al. | |
| 2021/0334630 A1 | 10/2021 | Lambert et al. | |
| 2022/0355475 A1 | 11/2022 | Oyama | |
| 2023/0030127 A1 | 2/2023 | Tsunoda et al. | |

OTHER PUBLICATIONS

International Application No. PCT/US2019/060507, International Search Report and Written Opinion dated Jan. 15, 2020, 9 pages.
International Application No. PCT/US2022/025976, International Search Report and Written Opinion dated Sep. 8, 2022, 11 pages.
U.S. Appl. No. 17/237,940, Notice of Allowance dated Mar. 15, 2023, 10 pages.

* cited by examiner

PERFORMING TASKS USING AUTONOMOUS MACHINES

CROSS-REFERENCES TO RELATED APPLICATIONS

This application claims the benefit of and priority to U.S. Provisional Application No. 62/757,316 filed Nov. 8, 2018, entitled "METHOD AND SYSTEM FOR FLEET MANAGEMENT AND COORDINATION." The contents of U.S. Provisional Application No. 62/757,316 are incorporated herein by reference in their entirety for all purposes.

TECHNICAL FIELD

The present disclosure relates generally to autonomous machines and more particularly to techniques for intelligently planning, managing and performing various tasks using autonomous machines.

BACKGROUND

The increasing use of autonomous machines is changing the way traditional tasks are performed. As a result, autonomous machines are increasingly being used in various domains. For example, an increasing number of autonomous machines in the form of autonomous trucks, bulldozers, loaders, excavators, etc. are being used at various work sites such as industrial work sites, mining sites, construction sites, commercial sites, manufacturing sites and so on. For instance, at a mine site, tasks performed by autonomous machines located at a mining site may involve using autonomous excavators to excavate materials, using autonomous loaders or bulldozers (dozers) to load materials into autonomous trucks, using autonomous trucks to transport the materials or objects from one location to another within the site, and so on. Unlike traditional machines, the use of autonomous machines for performing tasks has given rise to a whole new set of problems, especially in sites such as mines, etc. where non-uniform network connectivity across the site can pose significant problems. The autonomous nature of the machines for performing tasks also presents unique problems in how tasks are allocated and controlled, and how the tasks are performed by a set (or fleet) of autonomous machines, either individually or cooperatively.

BRIEF SUMMARY

The present disclosure relates generally to autonomous machines and more particularly to techniques for intelligently planning, managing and performing various tasks using autonomous machines. Various embodiments are described herein, including methods, systems, non-transitory computer-readable storage media storing programs, code, or instructions executable by one or more processors, and the like.

In certain embodiments, a control system (also referred to as a fleet management system or FMS) for managing a set of resources at a site is disclosed. The FMS includes capabilities for managing, tracking and coordinating a set of tasks performed by the set of resources, which may include one or more autonomous machines. The FMS is configured to control and manage the AMs at the site such that tasks are performed autonomously by the AMs. In some instances, a particular task may be performed autonomously by a single AM. In other instances, a particular task may be performed by multiple AMs acting in cooperation or collaboratively. An AM may directly communicate with another AM located on the site to complete a task and without requiring to be in constant communication with the FMS during the performance of the task.

In certain embodiments, a computer system is configured to perform a method that involves receiving, by a first AM, information regarding a task to be performed by a set of autonomous machines (AMs). The information is received from the FMS configured to manage the set of AMs. The method involves determining, by the first AM, a subtask to be performed by the first AM for the task. The method further involves autonomously performing, by the first AM, the subtask by communicating by the first AM with a second AM in the set of AMs without involving the FMS.

In certain examples, the method involves identifying, by the first AM, a set of unit tasks to be performed by the first AM corresponding to the subtask. The set of unit tasks includes a first unit task that when executed by the first AM causes the first AM to communicate with another AM in the set of AMs. In certain examples, the first AM executes the set of unit tasks corresponding to the subtask. Executing the set of unit tasks comprises identifying, by the first AM, a sequence for executing the set of unit tasks and executing, by the first AM, the set of unit tasks in accordance with the sequence. Executing the set of unit tasks further involves causing the first AM to communicate with the second AM independent of the FMS. In certain examples, executing the set of unit tasks comprises communicating by the first AM to another AM in the set of AMs an update to the set of unit tasks executed by the first AM.

In certain examples, the method involves identifying the first AM as a master AM. The method further involves receiving, by the first AM from the FMS, information identifying the set of AMs for performing the task and communicating, by the first AM, the information regarding the task to other AMs in the set of AMs. In certain embodiments, the method involves receiving, by the first AM from a second AM in the set of AMs, information indicative of a status of a subtask performed by the second AM corresponding to the task and communicating, by the first AM to the FMS, the information received by the first AM from the second AM.

In certain examples, the first AM receives the information regarding the task to be performed and information identifying the set of AMs for performing the task when located at a first location on the site and when in the first location, the first AM is able to receive communications from the FMS. The first AM communicates the information regarding the task to other AMs in the set of AMs. The first AM autonomously moves from the first location to a second location on the site. In certain examples, when in the second location, the first AM is able to communicate with the other AMs in the set of AMs and the first AM communicates the information regarding the task to the other AMs in the set of AMs from the second location. In certain examples, the first AM is an autonomous vehicle and the first AM autonomously moves from the first location to the second location by autonomously navigating a path from the first location to the second location.

In certain embodiments, a control system is disclosed. The control system is configured to manage a plurality of automated machines (AMs). The control system determines a set of one or more tasks to be performed by the set of AMs and the set of AMs to be allocated for performing the set of one or more tasks. The control system communicates information related to the set of tasks to the set of one or more AMs for performing the set of one or more tasks.

In certain examples, the control system is configured to perform a method that determines an expected time of completion for each task in the set of one or more tasks and determines an availability of each AM in the set of AMs over a period of time to perform the set of one or more tasks. In certain examples, identifying the set of one or more AMs to be allocated for performing the set of one or more tasks includes identifying the set of one or more AMs based upon the expected time of completion determined for each task in the set of one or more tasks and the availability of each AM in the set of AMs.

In certain examples, the method involves using an optimization technique to determine a particular allocation of the set of AMs for performing the set of one or more tasks. In one example, for a first task in the set of tasks, the particular allocation identifies a first subset of AMs from the set of one or more AMs for performing the first task. In one example, identifying the set of one or more AMs to be allocated for performing the set of one or more tasks comprises determining, by the control system, a particular allocation of the set of AMs for performing the set of one or more tasks. This includes determining, by the control system, a number of trips to be allocated to execute each task in the set of tasks and distributing, by the control system, the set of AMs to execute the set of tasks in proportion of a total number of hours taken to execute the number of trips for a task and a total number of hours taken to execute a set of trips for the set of one or more tasks. In some examples, the number of trips to be allocated to execute each task in the set of tasks is further determined based on determining a total amount of time taken by an AM in the set of AMs to execute the set of tasks.

The foregoing, together with other features and embodiments will become more apparent upon referring to the following specification, claims, and accompanying drawings.

BRIEF DESCRIPTION OF THE DRAWINGS

The present disclosure can be best understood by reference to the following description taken in conjunction with the accompanying figures, in which like parts may be referred to by like numerals.

DETAILED DESCRIPTION

Figure 1:
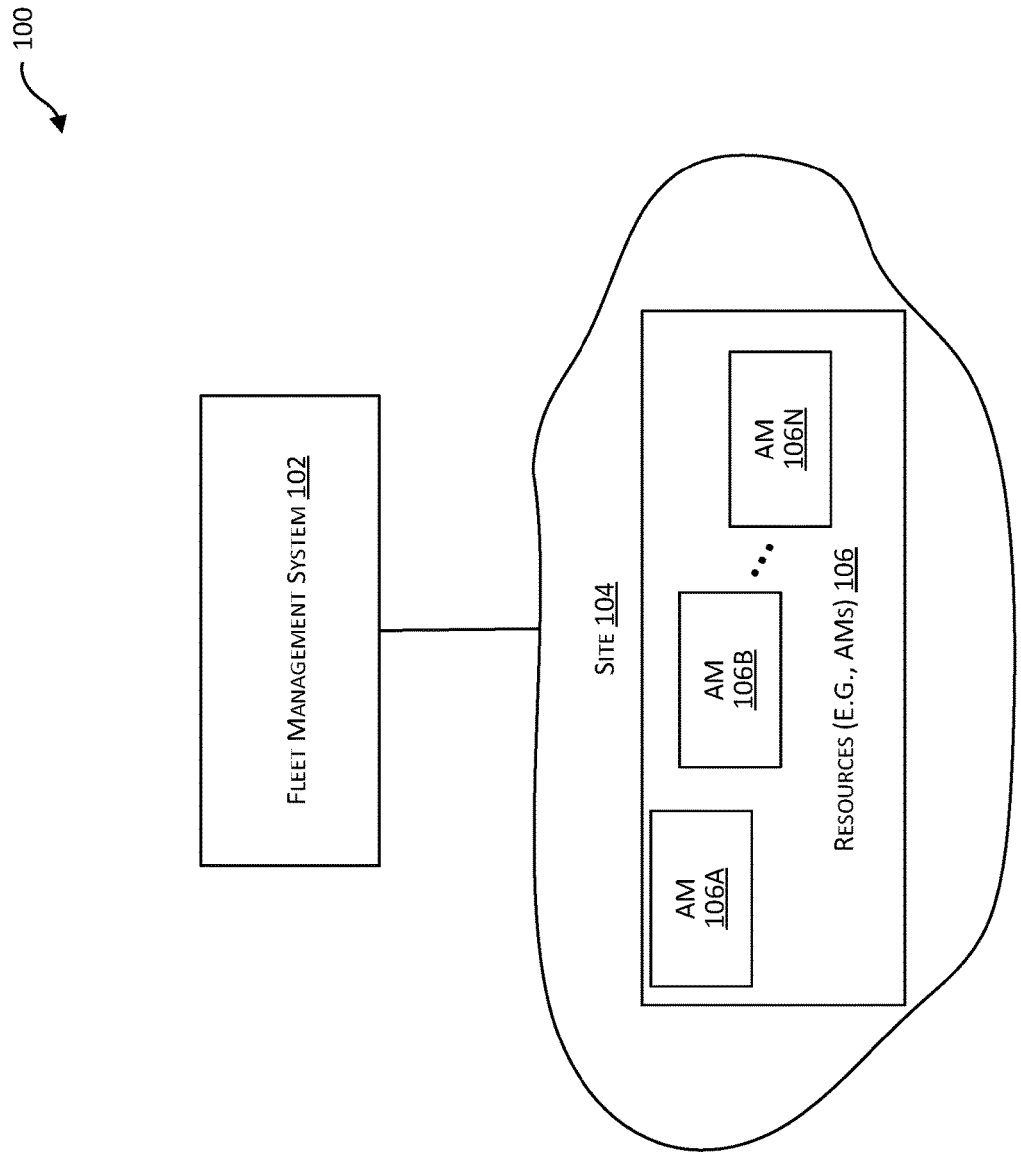
FIG. 1 depicts an example environment 100 including a control system (referred to as a fleet management system or FMS) for managing a set of resources at a site according to certain embodiments.

Exemplary examples and embodiments of the present disclosure will now be described in detail with reference to the drawings, which are provided as illustrative examples so as to enable those skilled in the art to practice the disclosure. Notably, the figures and examples below are not meant to limit the scope of the present disclosure to a single embodiment, but other embodiments are possible by way of interchanges of or combinations of with some or all of the described or illustrated elements. Wherever convenient, the same reference numbers will be used throughout the drawings to refer to same or similar parts. In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs. Where certain elements of these implementations can be partially or fully implemented using known components, only those portions of such known components that are necessary for an understanding of the present disclosure will be described, and detailed descriptions of other portions of such known components will be omitted so as not to obscure the disclosure.

The present disclosure relates generally to autonomous machines and more particularly to techniques for intelligently planning, managing and performing various tasks using autonomous machines. Various embodiments are described herein, including methods, systems, non-transitory computer-readable storage media storing programs, code, or instructions executable by one or more processors, and the like. In certain embodiments, a control system (also referred to as a fleet management system or FMS) is disclosed for managing a set of resources, including autonomous machines (AMs), at a site. The control system or FMS may be implemented using only software (e.g., code, instructions, program) executed by one or more processing units (e.g., processors, cores), using hardware, or combinations thereof.

The FMS includes capabilities for managing, tracking and coordinating a set of tasks performed by the set of resources, which may include one or more autonomous machines. In certain embodiments, the FMS is configured to control and manage the AMs at the site such that tasks are performed autonomously by the AMs. In some instances, a particular task may be performed autonomously by a single AM. In other instances, a particular task may be performed by multiple AMs acting in cooperation or collaboratively. An AM may directly communicate with another AM located on the site to complete a task and without requiring to be in constant communication with the FMS during the performance of the task. Thus, a particular AM within the site that does not have direct connectivity at all times to the FMS or that may have intermittent connectivity to the FMS can still complete its portion of a task by communicating with other AMs, such as with other AMs that are performing or are configured to perform other portions of that task. By providing AMs with capabilities to autonomously execute a task without having to communicate with the FMS, the execution of the task is not halted when a particular AM is unable to (e.g., is out of range of communication) communicate with the FMS or even when the AM itself becomes temporarily unavailable (e.g., due to equipment failure). Thus, delays or disruptions in the execution of tasks due to lack of connectivity with the FMS are avoided.

In certain embodiments, the FMS is configured to determine one or more tasks to be performed, perform planning to allocate the resources (e.g., AMs) for performing the tasks, communicate the tasks to the AMs, receive status communications from the AMs about the status of the task being performed, and generally ensure that the tasks get performed in a timely manner. In certain embodiments, the FMS is also configured to respond to and take corrective actions when unforeseen events or incidents occur, such as the breakdown of an AM, an AM taking much longer to complete a task than anticipated, unforeseen worksite conditions, and the like.

FIG. 1 depicts an example environment 100 including a control system 102 (referred to as a fleet management system 102 or FMS 102) for managing a set of resources at a site 104 according to certain embodiments. The FMS 102 includes capabilities for managing, tracking and coordinating a set of tasks performed by the set of resources 106, which may include one or more autonomous machines 106A-106N. The site 104 may be of various types such as a mining site, an industrial site, a construction site, a manufacturing site, and so on. The tasks that the FMS 102 is configured to manage may be specific to the site. For example, for a mining site, the tasks may include digging or excavating at a location, creating a pile of materials (e.g., rocks, coal), loading the materials into a transport vehicle (e.g., a truck), transporting the materials from one location to another location within the site, and the like. In the embodiment depicted in FIG. 1, one or more of these tasks are performed using one or more autonomous machines under the management of the FMS 102.

As used herein, the term "autonomous machine" (or AM) refers to a machine that is capable of performing one or more tasks or subtasks or operations autonomously and substantially free of any human user or manual input. An AM 106 may be specialized to perform a particular task or subtask autonomously such as digging or excavating, loading, lifting, transporting from one location to another, etc. For example, an AM may be an autonomous excavator that is capable of autonomously performing a digging or excavation task. As another example, an AM may be an autonomous loader (e.g., a bulldozer or dozer) that is capable of autonomously performing a loading task or subtask. Other examples of an AM include, without limitation, a compactor, a digger, a spreader, surveying equipment, and the like. The AMs 106 may include one or more autonomous vehicles (AVs), where an AV is capable of autonomously sensing its environment and navigating or driving along a path from a starting location to a destination autonomously and substantially free of any human user or manual input. According to the Society of Automotive Engineers (SAE), driving automation levels vary from SAE level 0 (constant manual supervision required, with only momentary automated assistance) to SAE level 5 (fully autonomous under all conditions). In the context of an automotive vehicle, an AV, as the term is used herein, is any vehicle that is SAE level 4 or higher. The use of the term vehicle and description with respect to a vehicle is not intended to be limiting or restrictive. The teachings described herein can be used with and applied to any type of vehicle, including those that operate on land (e.g., motorcycles, cars, trucks, buses), on water (e.g., ships, boats), by rail (e.g., trains, trams), aircrafts, spacecraft, and the like. Examples of autonomous vehicles include without restriction wagons, bicycles, motor vehicles (e.g., motorcycles, cars, trucks, buses), railed vehicles (e.g., trains, trams), watercrafts (e.g., ships, boats), aircrafts, spacecraft, and/or heavy equipment vehicles (e.g. dump trucks, tractors, bulldozers, excavators, forklifts, etc.). Examples of other operations that may be performed autonomously by one or more AMs include, without limitation, scooping and dumping operations, moving materials or objects (e.g., moving dirt or sand from one area to another), lifting materials, driving, rolling, spreading dirt, excavating, transporting materials or objects from one point to another point, and the like. The AMs may be used in various industries such as manufacturing, mining, construction, medical applications, packaging, assembly, surveying, mapping technologies logistics, etc.

The FMS 102 is configured to control and manage the AMs 106 at the site 104 such that tasks are performed autonomously by the AMs 106. In some instances, a particular task may be performed autonomously by a single AM. In other instances, a particular task may be performed by multiple AMs acting in cooperation or collaboratively. In certain embodiments, FMS 102 is configured to determine one or more tasks to be performed, perform planning to allocate the resources 106 (e.g., AMs) for performing the tasks (details provided below), communicate the tasks to the AMs, receive status communications from the AMs about the status of the task being performed, and generally ensure that the tasks get performed in a timely manner. In certain embodiments, the FMS 102 is also configured to respond to and take corrective actions when unforeseen events or incidents occur, such as the breakdown of an AM, an AM taking much longer to complete a task than anticipated, unforeseen worksite conditions, and the like.

As part of its operations, the FMS 102 is configured to communicate information regarding the tasks to be performed to the AMs. The AMs in turn are configured to communicate status information regarding the tasks being performed back to the FMS 102. The communications between the FMS 102 and the AMs 106 may be enabled by one or more communication networks and may utilize a variety of communication protocols such as Wi-Fi, satellite communications and the like. Traditionally, controller systems are centralized and the controller system thus acts as the centralized communication hub through which all communications have to occur. For example, a traditional centralized controller such as one use to manage a fleet of non-autonomous cars required that all communications were point-to-point between the centralized controller and individual cars. There was accordingly an expectation that the centralized controller was continuously able to communicate with each car and each car was able to communicate with the centralized controller. However, such connectivity cannot be guaranteed, and many times is not possible, in a site such as a mining site. For example, in some instances, connectivity between the FMS 102 and an AM may only occur when the AM is within a certain distance (communication distance) of the FMS 102. However, when the AM is performing a task, the AM may be at a location in the site 104 that is beyond this communication distance. As another example, while performing a task, the AM may be in a position (e.g., underground) where communication between the FMS 102 and the AM is not possible, even when the AM is within communication distance. As yet another example, the communication infrastructure at the site 104 may be such allowing only for intermittent communication connectivity between the FMS 102 and one or more AMs.

In certain embodiments, tasks to be performed by AMs 106 are performed to completion even when there is no connectivity, or at least there is no continuous connectivity, between the FMS 102 and the AMs 106. This is enabled by enabling inter-AM communications, i.e., communications between two or more of the AMs without involving the FMS 102. For example, during the performance of a particular task, even when there is no connectivity between the particular AMs performing the particular task and the FMS 102, the particular AMs are capable of communicating with each other to get the particular task performed.

The AMs 106 may communicate with each another using various different techniques and protocols. Examples of communication protocols and techniques that may be used for inter-AM communications include, but are not limited to, V2I (Vehicle-to-Infrastructure), V2V (Vehicle-to-vehicle), V2P (Vehicle-to-Pedestrian), V2D (Vehicle-to-device), V2G (Vehicle-to-grid), and the like.

The FMS 102 provides capabilities for enabling the AMs 106 to execute and perform tasks autonomously. An AM may directly communicate with another AM located on the site to complete a task and without requiring to be in constant communication with FMS 102 during the performance of the task. Thus, a particular AM (e.g., 106A) within the work site 104 that does not have direct connectivity at all times to the FMS 102 or that may have intermittent connectivity to the FMS 102 can still complete its portion of a task by communicating with other AMs, such as with other AMs that are performing or are configured to perform other portions of that task. By providing AMs with capabilities to autonomously execute a task without having to communicate with FMS 102, the execution of the task is not halted when a particular AM is unable to (e.g., is out of range of communication) communicate with the FMS 102 or even when the AM itself becomes temporarily unavailable (e.g., due to equipment failure). Thus, delays or disruptions in the execution of tasks due to lack of connectivity with the FMS 102 are avoided.

In some embodiments, the FMS 102 may itself be located at the site 104. In some other embodiments, the FMS 102 may be located remotely from the site 104. In the example depicted in FIG. 1 and described herein, the FMS 102 is shown as managing resources for a single site 104. This is however not intended to be limiting. In alternative embodiments, the FMS 102 may manage resources, including multiple AMs, at multiple different sites.

Figure 2:
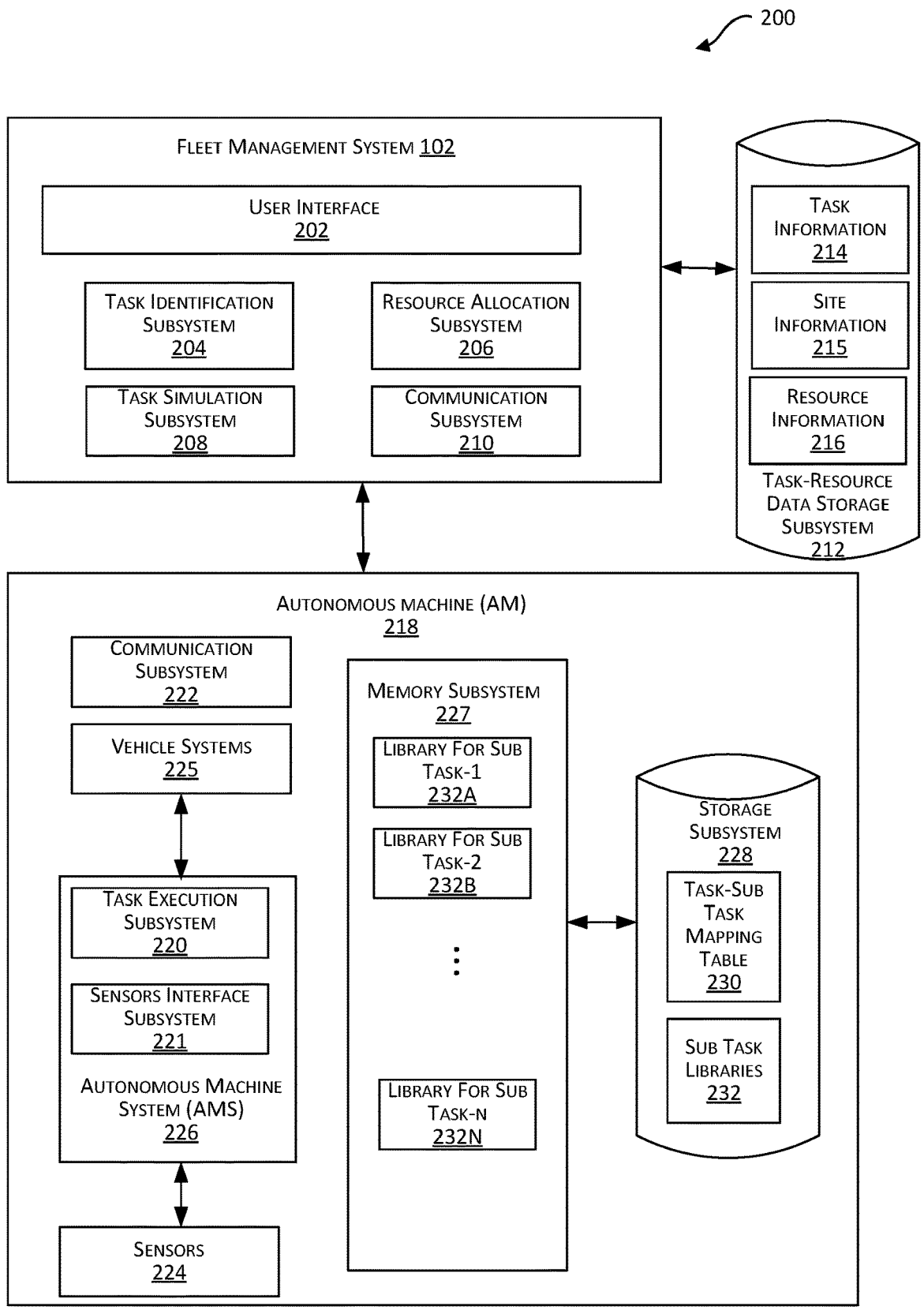
FIG. 2 depicts a simplified block diagram of an FMS and an autonomous machine (AM) that is managed by the FMS, according to certain embodiments.

FIG. 2 depicts a simplified block diagram of an FMS 102 and an autonomous machine (AM) 218 that is managed by the FMS 102, according to certain embodiments. The FMS 102 and the AM 218 may comprise multiple systems and subsystems communicatively coupled to each other via one or more communication channels. The embodiment depicted in FIG. 2 is merely an example and is not intended to unduly limit the scope of claimed embodiments. One of ordinary skill in the art would recognize many possible variations, alternatives, and modifications. For example, in some implementations, the FMS 102 and the AM 218 may have more or fewer subsystems or components than those shown in FIG. 2, may combine two or more subsystems, or may have a different configuration or arrangement of subsystems.

In the embodiment depicted in FIG. 2, FMS 102 includes a user interface subsystem (UI) 202, a task identification subsystem 204, a resource allocation subsystem 206, a task simulation subsystem 208, and a communication subsystem 210. The subsystems may be implemented using software only, hardware only, or combinations thereof. The software may be stored on a non-transitory computer readable medium (e.g., on a memory device) and may be executed by one or more processors (e.g., by computer systems) to perform its functions.

In certain embodiments, the task identification subsystem 204 is configured to identify a set of tasks to be performed at the site 104 using one or more AMs 106. In certain instances, a user or operator of FMS 102 may provide information to the FMS 102 identifying the tasks to be performed via the UI 202. This information may be received and processed by the task identification subsystem 204. In some other instances, the task identification subsystem 204 may determine a set of tasks to be performed based upon the task information 214 stored in a data storage subsystem 212 accessible to FMS 102. The task identification subsystem 204 may identify the tasks to be performed and also a time frame within which each task is to be performed.

The resource allocation subsystem 206 is configured to determine a set of resources to be allocated for performing the set of tasks identified by the task identification subsystem 204. In certain embodiments, the resource allocation subsystem 206 has access to resource information 216 identifying the resources (e.g., AMs) available at a site for performing the tasks. For example, the resource information 216 may indicate that there are four excavators, four dozers, and five trucks available at a mine site 104. For each resource, information may also be provided identifying the time frame when the resource is available. For example, the resource information 216 may indicate that, of the five trucks, only four trucks are available during the first 2 hours of operation and all five trucks are available in the next two hours of operation. For each resource, the resource information 216 may also provide information about the resource, such as the model of the resource, the capabilities of the resource, including the autonomous capabilities of the truck, and the like. For example, for each available truck, information may be provided regarding the model of the truck, the hauling capacity (e.g., carrying capacity in tons) of the truck, the maximum and average speeds of the truck, the ability of the truck to perform autonomous navigation and driving along a path, and the like. The resource allocation subsystem 206 may use all this information to allocate resources to be used for performing a task. After the resource allocation subsystem 206 has identified the resources to be used for performing a task, information identifying the task and the resource allocation information is communicated by the resource allocation subsystem 206 to the resources or AMs allocated for performing the task. The task and resources information may be communicated from the FMS 102 to the AMs using the communication subsystem 210.

In certain embodiments, the FMS 102 is configured to transmit an instruction (command) to a set of AMs to perform a set of tasks. The communication subsystem 210 may be configured to facilitate communications between the FMS 102 and the set of AMs via wired or wireless links. Various modes of communication may be used. In certain instances, a "normal" mode may be provided and selected for the communications. In this normal mode, information regarding the tasks is communicated from the FMS 102 to each of the AMs that have been selected for performing the task. In certain other instances, a "master-slave" mode may be provided and selected for the communications. In this master-slave mode, information regarding the tasks is communicated from the FMS 102 to a master AM and the master AM then communicates the information to one or more slave AMs responsible for performing the task. In some instances, the master AM may itself perform the task or a portion of the task. In other instances, the master AM may only be responsible for communicating the information to the one or more slave AMs and may itself not be involved in performance of the task.

The information communicated from the FMS 102 to the AMs (either in normal mode or in master-slave mode) may identify a single task to be performed and the one or more resources to be used for performing the task, or may identify multiple tasks, and for each task, the one or more resources to be used for performing the task.

In certain embodiments, the FMS 102 may also include a task simulation subsystem 208. The FMS 102 may use this subsystem to simulate a task to be performed to determine the expected time of completion for the tasks. The performance of the task using various available resources, including various combinations of available resources, may be simulated to determine an optimal combination of resources for performing the task. When a task includes multiple subtasks, the task simulation subsystem 208 may simulate these subtasks to determine an expected time of completion for each subtask and for the overall task. The FMS 102 may use this information to determine whether a task (and/or its subtasks) is being performed in an expected manner or whether there are problems (e.g., problems potentially indicated by a task or subtask not getting completed in the expected time frame).

The task simulation subsystem 208 may employ various simulation tools and techniques (e.g., Monte Carlo simulation) to simulate the execution of the set of tasks. In certain embodiments, the task simulation subsystem 208 may utilize historical data related to past execution of a set of tasks to simulate the execution of a set of tasks. The historical data may be stored as part of the resource information 216 in the task-resource data storage subsystem 212 of the FMS 102. The historical data may include, for instance, service history data related to the resources (i.e., the AMs), machine/vehicle breakdown history, the time taken to execute tasks, past occurrences of unexpected events during the execution of tasks such as falling rocks, site flooding and so on.

FIG. 2 also depicts an example AM 218. In the example shown in FIG. 2, the AM 218 includes an autonomous machine system (AMS) 226, a communication subsystem 222, sensors 224, vehicle systems 225, a system memory subsystem 227, and a storage subsystem 228. The system and subsystems of the AM 218 may be implemented using software only, hardware only, or combinations thereof. The software may be stored on a non-transitory computer readable medium (e.g., on a memory device) and may be executed by one or more processors (e.g., by computer systems) to perform its functions. In the embodiment depicted in FIG. 2, all the systems and subsystems are shown as being in or on AM 218. This is however not intended to be limiting. In alternative embodiments, some of the subsystems (e.g., some sensors of sensors 224) may be remotely located from AM 218.

The communication subsystem 222 facilitates communication between the FMS 102 and the AM 218 via wired or wireless links. The communication subsystem 222 enables communications between the AM 218 and the FMS 102 and also between the AM 218 and other one or more AMs. Various different communication techniques and protocols may be used for the communications. For example, communications between the AM 218 and the FMS 102 may be facilitated using a variety of communication protocols such as Wi-Fi, satellite communications, and the like. For example, communications between the AM 218 and other AMs may be facilitated using V2I (Vehicle-to-Infrastructure), V2V (Vehicle-to-vehicle), V2P (Vehicle-to-Pedestrian), V2D (Vehicle-to-device), V2G (Vehicle-to-grid), and the like.

In certain embodiments, in addition to other subsystems, the AMS 226 (also referred to as an AM controller system) comprises a task execution subsystem 220 and a sensors interface subsystem 221. The task execution subsystem 220 is configured to receive information from the FMS 102 or from a master AM, regarding a task to be performed and enables the AM 218 to autonomously execute and perform the task. Responsive to the task to be performed, the task execution subsystem 220 is configured to determine a set of subtasks to be performed by the AM 218 related to the task. The task execution subsystem 220 may then cause these subtasks to be autonomously performed by the AM 218. In certain embodiments, a set of one or more unit tasks may be determined for a subtask. The task execution subsystem 220 may then cause the task, subtasks, or unit tasks to be performed autonomously by AM 218 and without requiring the AM 218 to be in communication with the FMS 102 during the execution of the task or subtask or unit task. Details related to the operations performed by the task execution subsystem 220 are described below in further detail with respect to the flowchart depicted in FIG. 4 and the accompanying description.

In certain embodiments, the sensors interface subsystem 221 provides an interface that enables communications between the sensors 224 and the AMS 226. The sensors interface subsystem 221 may receive sensor data from the sensors 224 and provide the data to one or more subsystems of the AM 218 including the AMS 226. The sensors interface subsystem 221 is configured to process the sensor data received from the sensors 224, where the sensors data may describe the state of AM 218 (e.g., position on a path) and the state of the AM's environment (e.g., state and position of objects in the AM's environment, where the objects could be other AMs, people, obstacles, ditches or holes, etc.). The sensors interface subsystem 221 may preprocess the received sensor data before providing it to the task execution subsystem 220 for further analysis. The AMS 226 may use this information to autonomously execute a set of unit tasks and/or control one or more autonomous functions or operations of AM.

The sensors interface subsystem 221 is coupled to the sensors 224 and the vehicle systems 225 via wired or wireless links. One or more different communication protocols may be used for facilitating communications between the AMS 226 and the sensors 224 and between the AMS 226 and the vehicle systems 225. For example, the AMS 226 may issue instructions/commands to the vehicle systems 225 to programmatically and autonomously control various aspects of the AM's motion such as the propulsion, braking, steering or navigation, and auxiliary behavior (e.g., turning lights on) functionality of the AM.

The vehicle systems 225 include various electro-mechanical systems, components, linkages, etc. that enable the AM 218 to perform its intended functions including functions that are performed autonomously by the AM 218. For example, if the AM 218 is an autonomous vehicle, the vehicle systems 225 may include systems of the vehicle that enable the autonomous vehicle to autonomously travel or navigate along a particular path or course. The vehicle systems 225 may include for example, a steering system, a throttle system, a braking system, a propulsion system, etc. for driving the autonomous machine, electrical systems, auxiliary systems (e.g., systems for outputting information to a driver or passenger of autonomous vehicle 120), and the like. In embodiments where the AM 218 is a vehicle, the vehicle systems 225 can be used to set the path and speed of the AM 218. In embodiments where the AM that is configured to perform a specialized operation (e.g., an excavator configured to autonomously perform an excavation task, a dozer configured to autonomously perform load operations, a truck that is configured to autonomously transport materials from a first location to a second location, etc.), the vehicle systems 225 may include systems of the AMs that enable such operations to be performed.

The sensors 224 include one or more sensors that are configured to capture information about the AM 218 and about the AM's environment. One or more of sensors 224 may be located on or in the AM 218 ("onboard sensors") or may even be located remotely ("remote sensors") from the AM 218. The sensors 224 can obtain environmental information for the AM 218. The sensor data captured by the sensors 224 may be communicated to one or more other subsystems or systems of AM 218 using wired or wireless links and protocols. The sensors 224 may include, without limitation, LIDAR (Light Detection and Ranging) sensors, radars, cameras (different kinds of cameras with different sensing capabilities may be used), Global Positioning System (GPS) and Inertial Measurement Unit (IMU) sensors, Vehicle-to-everything (V2X) sensors, audio sensors, and the like. The sensors 224 can obtain (e.g., sense, capture) environmental information for the AM 218 and communicate the sensed or captured sensor data to the AMS 226 for processing. Other sensors may include proximity sensors, SONAR sensors, and other sensors.

Examples of radar sensors (i.e. long range radar, short range radar, imaging radar etc.) may include sensors that are used to detect objects in the environment of the AM 218 and to determine the velocities of the detected objects. Examples of LIDAR sensors include sensors that use surveying techniques that measure distances to a target by using light in the form of a pulsed laser light. This is done by illuminating the target to be measured with pulsed laser light and measuring the reflected pulses using the sensor. Examples of V2X sensors include sensors that use V2X communication technology to communicate with moving parts of a traffic system. For example, the AM 218 may use a V2X sensor for passing and/or receiving information from a vehicle to another entity around or near the autonomous vehicle. A V2X communication sensor/system may incorporate other more specific types of communication infrastructures such as V2I (Vehicle-to-Infrastructure), V2V (Vehicle-to-vehicle), V2P (Vehicle-to-Pedestrian), V2D (Vehicle-to-device), V2G (Vehicle-to-grid), and the like. An IMU (Inertial Measurement Unit) sensor may be an electronic device that measures and reports a body's specific force, angular rate, and sometimes the magnetic field surrounding the body, using a combination of accelerometers, gyroscopes, magnetometers, etc. GPS sensors use a space-based satellite navigation system to determine geolocation and time information.

Figure 3:
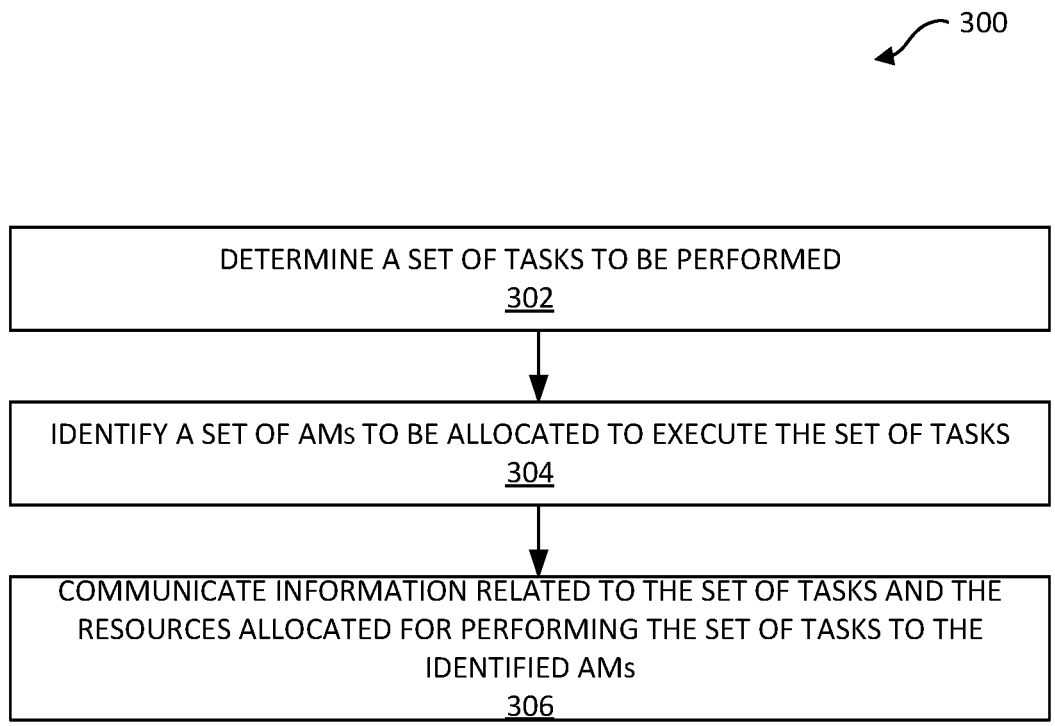
FIG. 3 depicts a flow chart illustrating a method performed by the FMS, according to certain embodiments.

FIG. 3 depicts a flow chart 300 illustrating a method performed by the FMS, according to certain embodiments. The processing depicted in FIG. 3 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process presented in FIG. 3 and described below is intended to be illustrative and non-limiting. Although FIG. 3 depicts various processing steps occurring in a particular sequence or order, this is not intended to be limiting. In certain alternative embodiments, the steps may be performed in a different order, certain steps omitted, or some steps performed in parallel. In certain embodiments, such as in the embodiment depicted in FIG. 3, the processing depicted in FIG. 3 may be performed by the task identification subsystem 204 and the resource allocation subsystem 206 of the FMS 102 shown in FIG. 2.

At block 302, the FMS 102 determines a set of one or more tasks to be performed. In certain examples, the task identification subsystem 204 determines a set of tasks to be performed based on input received from by a user (e.g., an operator) of the FMS 102. For instance, the user may utilize a user interface (UI) 202 of the FMS 102 to specify a set of tasks to be performed by the FMS. In other examples, the FMS 102 may utilize task information 214 stored in the task-resource data storage subsystem 212 to determine a set of tasks to be performed. The task information 214 may include, for instance, information regarding the types of tasks performed by resources located on the site such as scooping and dumping operations, moving materials or objects (e.g., moving dirt or sand from one area to another), lifting materials, driving, rolling, spreading dirt, excavating, transporting materials or objects from one point to another point, and the like. The task information 214 may identify a set of tasks to be performed within a certain time period. For each task to be performed, the task information 214 may include information identifying a time for completing the task, information related to the total time taken to execute tasks, the total number of trips required to execute the tasks and so on.

At block 304, a set of resources (e.g., AMs) is identified for performing the set of tasks identified in 302. The resource allocation processing in 304 may be performed by the resource allocation subsystem 206 depicted in FIG. 2. In certain embodiments, the resource allocation performed in 304 may be based upon the following pieces of information: (a) Task information 214 identifying the parameters of the task that describe information about particular of a task to be performed. For example, if the task involves the transportation of materials from Point A to Point B, the task-related information may identify the amount/size of materials to be transported, the nature of the materials (e.g., whether it is sand, wood, coal, etc.), and the distance between Point A and Point B. Information may also be provided identifying a time period within which the task is to be completed. In certain instances, a start time and an end time for the task may be provided.

(b) Site information 215 identifying information about the site where the task is to be performed. For example, this information may include information such as a detailed map of the site, coordinates of various locations within the site, the elevation of the various locations, distances between the locations, and so on.

(b) Information identifying availability of resources for performing the task and the capabilities of the available resources—This information may be stored as part of the resource information 216. The resource information 216 may include information about the makes/models of the AMs, the capabilities of the AMs, including the autonomous capabilities, and the like. Information regarding an AM's capabilities may include information about loading capacity of the AM, speed capability or restrictions of the AM (e.g., number of trips an AM can make between two locations), loading and/or dumping time of the AM, and the like. The resource information 216 may include information about the availability of resources for executing the set of tasks during different time periods. Further details related to processing performed as part of resource allocation in 304 are described below.

After the one or more resources (e.g., AMs) are identified in 304 to be used for performing the set of tasks identified in 302, at block 306, information related to the set of tasks and the resources allocated for performing the set of tasks is communicated from the FMS to the AMs. In certain embodiments, a command is transmitted from the FMS to the AMs identifying the set of tasks and the set of resources allocated for performing the set of tasks.

Various modes of communication may be used to communicate the information to the AMs in 306. In certain instances, a "normal" mode may be provided and selected for the communications. In this normal mode, for each task identified in 302, information regarding the task and the resources allocated for that task in 304 is communicated from the FMS 102 to each of the AMs that have been selected in 304 for performing that task. In certain other instances, a "master-slave" mode may be provided and selected for the communications. In this master-slave mode, for a task identified in 302, information regarding the task is communicated from FMS 102 to a "master" AM and the master AM then communicates the information to one or more slave AMs selected in 304 for performing the task. The master AM may also be identified in 304. In some instances, the master AM may itself perform the task or a portion of the task. In other instances, the master AM may only be responsible for communicating the information to the one or more slave AMs and may itself not be involved in performance of the task.

The information communicated from the FMS 102 to the AMs (either in normal mode or in master-slave mode) may identify a single task to be performed and the one or more resources to be used for performing the task, or may identify multiple tasks, and for each task, the one or more resources to be used for performing the task.

Figure 4:
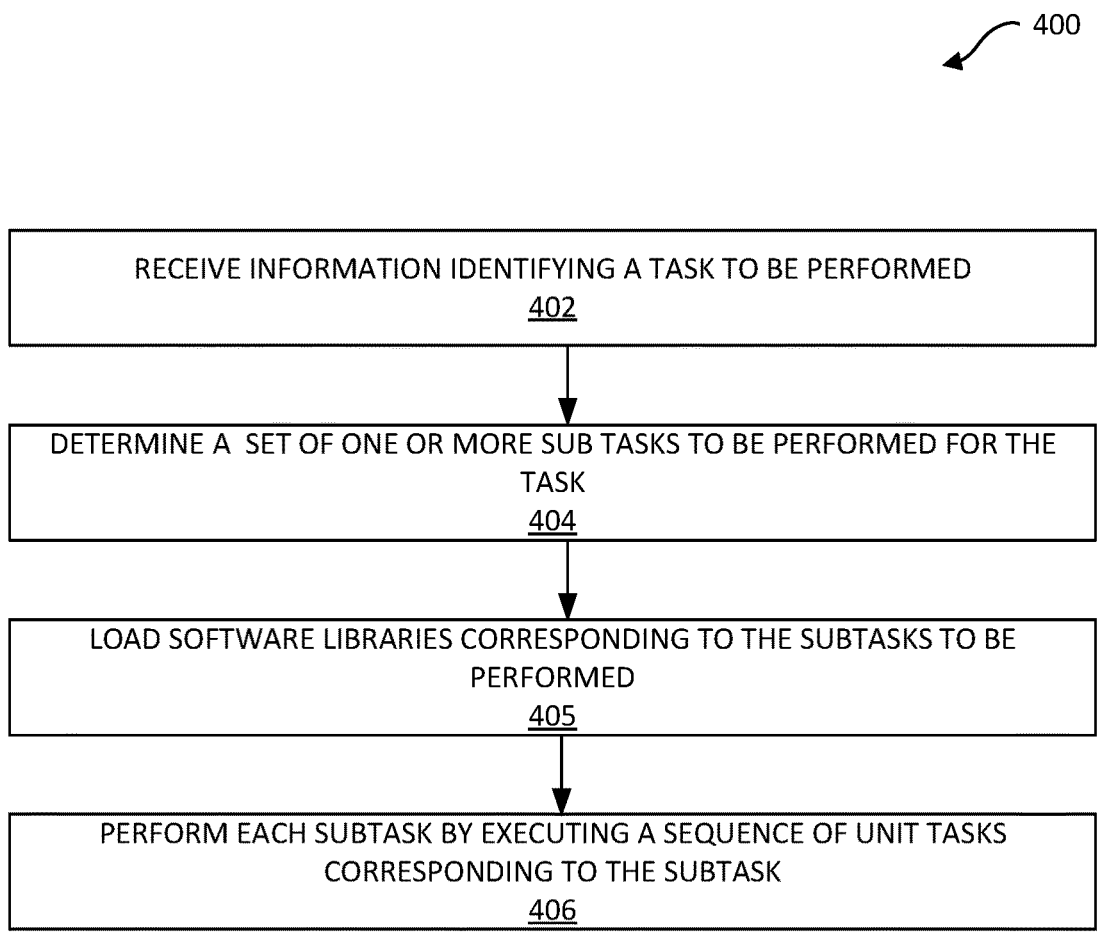
FIG. 4 depicts a flow chart illustrating a method performed by an AM for executing a task, according to certain embodiments.

FIG. 4 depicts a flow chart 400 illustrating a method performed by an AM for executing a task, according to certain embodiments. The processing depicted in FIG. 4 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process presented in FIG. 4 and described below is intended to be illustrative and non-limiting. Although FIG. 4 depicts various processing steps occurring in a particular sequence or order, this is not intended to be limiting. In certain alternative embodiments, the steps may be performed in a different order, certain steps omitted, or some steps performed in parallel. In certain embodiments, such as in the embodiment depicted in FIG. 4, the processing depicted in FIG. 4 may be performed by the task execution subsystem 220 in the AM 218.

At block 402, an AM receives information identifying a task to be performed. If the information received in 402 identifies multiple tasks to be performed, the information received in 402 may also identify the one or more tasks for which the AM receiving the information has been selected. For example, the AM may receive a request or a command from the FMS 102 to perform a task. As noted above, examples of tasks may include, without limitation, scooping and dumping operations performed on a work site, moving materials or objects (e.g., moving dirt or sand from one area to another) between locations within a work site, lifting materials, driving, rolling, spreading dirt, excavating, transporting materials or objects from one point to another point within a work site and the like.

For purposes of simplicity, it is assumed that the information received in 402 is for a particular task to be performed by the AM. At block 404, based upon the task to be performed, the receiving AM determines, a set of one or more subtasks to be performed by the AM for the task. In certain instances, the task to be performed may correspond to a set of subtasks, each of which are to be performed by the receiving AM. In such a scenario, the receiving AM identifies the subtasks to be performed.

In certain other instances, the task to be performed may correspond to a set of subtasks, where only a subset of the subtasks are to be performed by the particular receiving AM and at least one subtask is to be performed by a different AM. For example, the task may involve digging at Location A in the site and then moving the materials from Location A to another Location B in the site. This task may involve three separate subtasks: (1) autonomously digging at Location A to be performed by an excavator; (2) using a dozer to autonomously load a truck with the dug materials at Location A, and (3) using a truck to autonomously transport the materials from Location A to Location B. For this task, in the normal mode, each of the excavator, dozer, and the truck may receive the task command in 402. Then, in 404, the excavator determines that it has to perform subtask #1 (digging), the dozer determines that it has to perform subtask #2 (loading), and the truck determines that it has to perform subtask #3 (transporting).

In certain examples, the processing for identifying the subtasks for the AM may be performed by the task execution subsystem 220 of an AM. In certain embodiments, the task execution subsystem 220 may utilize information stored in a task-subtask mapping table 230 in the storage subsystem 228 that maps a task to be performed to its corresponding subtasks and also identifies the subtasks to be performed by the particular receiving AM (e.g., for the above example, which subtask is to be performed by the excavator, dozer, and the truck).

In certain embodiments, upon identifying a set of subtasks to be performed by the AM, in 405, software libraries corresponding to the subtasks to be performed are loaded by the AM into the AM's system memory (e.g., RAM) for execution. In certain implementations, the task execution subsystem 220 accesses the specific libraries for implementing the subtasks from one or more subtask libraries 232 stored in the data storage subsystem 228 and loads the subtask libraries (e.g., 232A, 232B . . . 232N) specific to implementing the subtasks related to the task into the memory subsystem 227 (which may include, for e.g., system memory) for execution of the subtasks. These loaded libraries are then executed by one or more processors of the AM for performing the subtasks.

In certain embodiments, each subtask to be performed by an AM is further broken down into a sequence of unit tasks. In certain embodiments, the software library loaded in the system memory 227 for a subtask implements a sequence of unit tasks for the subtask. At block 406, the AM performs each subtask by executing and stepping through the sequence of unit tasks corresponding to that subtask, where performance of the unit tasks involves communication between the AM executing the unit tasks and at least one other AM. In certain embodiments, executing a set of unit tasks may involve identifying a specified order of operations to be performed corresponding to the set of unit tasks and executing the unit tasks in accordance with the specified order. In certain examples, one or more of the unit tasks executed by an AM may involve communications with another AM.

As part of 406, when needed, an AM can make small updates to the sequence of unit tasks performed by the AM. For example, these changes may be made to accommodate incidents such as problems encountered during the performance of a unit task. For example, when an AM encounters an obstacle or a hindrance during the performance of a unit task, the AM may reset it's time to complete the unit task, and the subtask, to a longer time, or can re-route or update the sequence of unit steps to complete the subtask. The AM may also communicate with a second AM to let the second AM know of the dynamic changes. In some instances, the second AM may also update or modify its performance of its unit tasks in response to the dynamic change information received from the first AM. Information regarding the dynamic changes may also be communicated by the AMs to the FMS. The FMS in response may take corrective actions, such as changing the overall time of completion of the task, changing the allocation of resources for the task, and the like.

Figure 5:
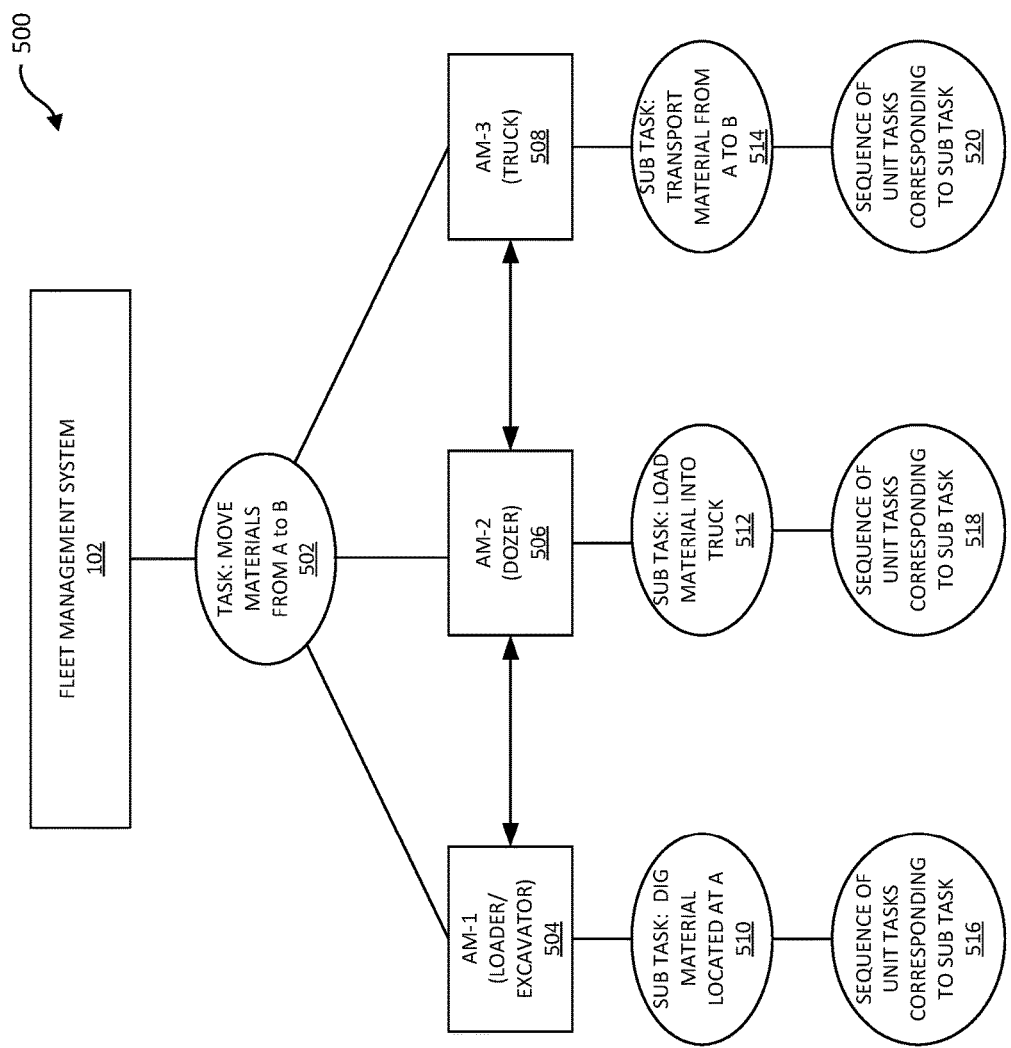
FIG. 5 is an exemplary illustration of the execution of a single task by a set of AMs based on a command received from the FMS, according to some embodiments.

Additional details related to the operations performed by an AM to execute tasks, subtasks and unit tasks are described with respect to the execution of an exemplary task depicted in FIG. 5. In the example shown in FIG. 5, the FMS 102 determines a task 502 to be performed: "Move Materials from A to B" to move materials from a specified source location (A) to a specified destination location (B) within a site. The FMS 102 identifies a set of AMs 504, 506 and 508 to perform the task and transmits a command to each of the identified AMs to execute the task. Upon receiving the command from the FMS, each of the AMs 504, 506 and 508 identify their respective subtasks related to the task to be performed and execute their subtasks.

For instance, the loader/excavator 504 may identify a "digging subtask" 510 to be performed that involves autonomously digging the materials at Location A, the dozer 506 may identify a "loading subtask" to load a truck with the dug materials at Location A and the truck 508 may identify a "hauling subtask" to haul/transport the materials from Location A to Location B. In certain examples, the execution of a subtask by the AMs may involve the execution of a set of one or more unit tasks related to the execution of the subtasks. In the above example involving the three subtasks of (1) autonomously digging at Location A to be performed by an excavator; (2) using a dozer to autonomously load a truck with the dug materials at Location A, and (3) using a truck to autonomously transport the materials from Location A to Location B:

(a) The sequence of unit tasks performed autonomously by the excavator may involve a unit task that causes the excavator to communicate with the dozer when the excavator has finished excavating that the excavation subtask has been completed and the materials are ready to be loaded by the dozer;

(b) The sequence of unit tasks performed autonomously by the dozer may involve (1) receiving and acknowledging by the dozer to the excavator that it has received information indicating that the excavator has finished its subtask and the dozer is ready to start its subtask, and (2) communicating with the truck to cause the truck to arrive at Location A, (3) communicating with the truck to determine when the truck is ready to be loaded, and (4) communicating with the truck to indicate when the dozer has completed the loading subtask; and (c) The sequence of unit tasks performed autonomously by the truck may involve (1) receiving and responding to the dozer's communication that it is ready for loading the truck at Location A, (2) sending a communication to the dozer to indicate when the truck is ready to be loaded, and (3) receiving a communication from the dozer upon completion of the loading subtask so that the truck is now ready to perform the transporting subtask.

Accordingly, the unit tasks may include condition checks (including conditions to be checked both before and after a particular unit task is performed), communications of status information between AMs, and the like between AMs. These communications are accomplished without involving the FMS. This enables the unit tasks, the subtasks, and the overall task to be performed by the AMs in a cooperative or collaborative manner without needing to communicate with the FMS. In certain instances, the unit tasks performed by an AM may also include communications with the FMS. If the AM has connectivity with the FMS, then the AM may communicate with the FMS per the unit task. However, in situations where the AM has no connectivity to the FMS when the unit task is to be performed, the AM may skip this particular unit task and move on with the next unit task. In this manner, a lack of communication with the FMS does not prevent the completion of the unit and subtasks performed by the AM and, in general, the performance of the task.

In certain examples, each unit task may be associated with a set of one or more default operations. These one or more default operations may be performed by an AM when the AM encounters an error while performing the unit task. Examples of errors encountered by an AM while performing a unit task may include, for instance, an unexpected event such as a vehicle malfunction, a road block, intermittent network connection to the FMS and so on that may occur during the execution of a unit task. In certain examples, a default operation performed by the AM may include sending status updates to the FMS 102 regarding information of the error encountered during its execution, logging the error to an error log, notifying the master AM in the case of a master-slave mode, and so on.

As noted above, in certain instances, a "master-slave" mode may be utilized by the FMS to communicate with the AMs. In this master-slave mode, the FMS 102 communicates information regarding a task to a "master" AM and the master AM then communicates the information to one or more slave AMs for performing the task. In some instances, the master AM may itself perform the task or a portion (e.g., a subtask) of the task. In other instances, the master AM may only be responsible for communicating or relaying the information received from the FMS to the one or more slave AMs and may itself not be involved in performance of the task or a portion (e.g., a subtask) of the task.

Figure 6:
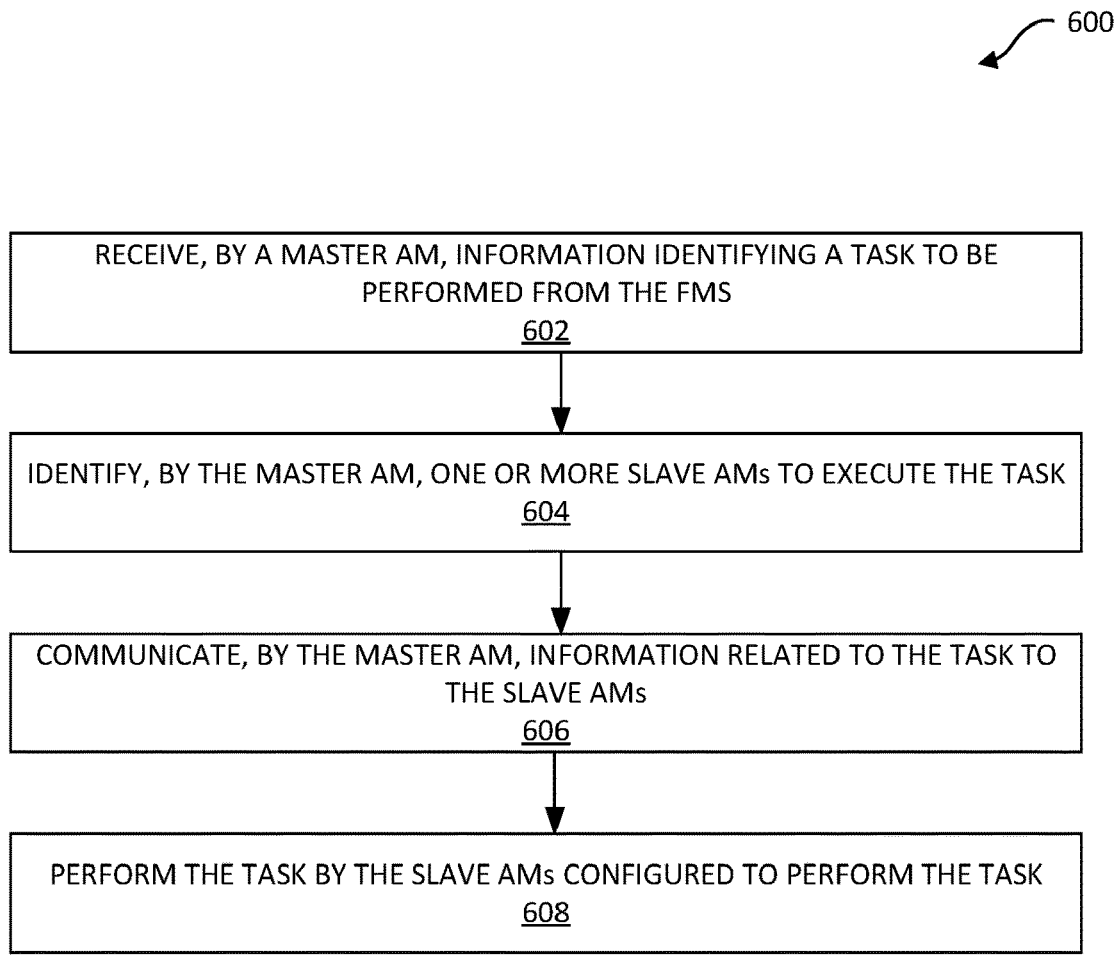
FIG. 6 is a flow chart illustrating a method performed by a "master AM" for communicating information received from an FMS to one or more slave AMs, according to certain embodiments.

FIG. 6 is a flow chart 600 illustrating the operations performed by a "master AM" for communicating information received from an FMS to one or more slave AMs, according to certain embodiments. The processing depicted in FIG. 6 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process presented in FIG. 6 and described below is intended to be illustrative and non-limiting. Although FIG. 6 depicts various processing steps occurring in a particular sequence or order, this is not intended to be limiting. In certain alternative embodiments, the steps may be performed in a different order, certain steps omitted, or some steps performed in parallel. In certain embodiments, such as in the embodiment depicted in FIG. 6, the processing depicted in FIG. 6 may be performed by the task execution subsystem 220 shown in FIG. 2.

At block 602, a master AM receives information from FMS 102 identifying a task (or a set of tasks) to be performed. In certain examples, upon identifying a task to be performed, the FMS 102 may identify one or more AMs to perform the task, and then select one of the identified AMs as the master AM. In some other instances, one or more particular AMs maybe preconfigured as master AMs, and FMS 102 may select one of these master AMs. Information identifying one or more master AMs may be included in resource information 216 and may be accessible to the FMS. For example, an AM may be tagged as a master due to certain of its capabilities. In certain other examples, the FMS may identify an AM to be a master AM because of its particular location within the site. For instance, the master AM may be located close to (i.e., within a range of communication of) the other identified AMs and the FMS 102 in the site.

At block 604, the master AM identifies one or more slave AMs that are to execute the task. In certain examples, the FMS 102 may provide the information identifying the slave AMs required for executing the task to the master AM and the information may be received by the master AM in 602. In other examples, the master AM may itself identify the slave AMs for executing the task. In certain embodiments, the master AM may identify the subtasks involved in the task and identify slave AMs for performing one or more of the subtasks.

At block 606, the master AM communicates the task information received from the FMS in 602 to each of the one or more slave AMs identified in 604. In some instances, the master AM may itself perform the task or a portion (e.g., a particular subtask of the task) of the task. In other instances, the master AM may only be responsible for communicating the information received from the FMS to the one or more slave AMs and may itself not be involved in performance of the task.

At block 608, the task is performed by the AMs configured to perform the task. The AMs performing the tasks include the slave AMs identified in 604 and also the master AM in situations where the master AM is also identified to perform a portion (e.g., a subtask) of the task. In certain embodiments, the AMs may perform the task according to the processing corresponding to 404, 405, and 406 depicted in FIG. 4.

Figure 7:
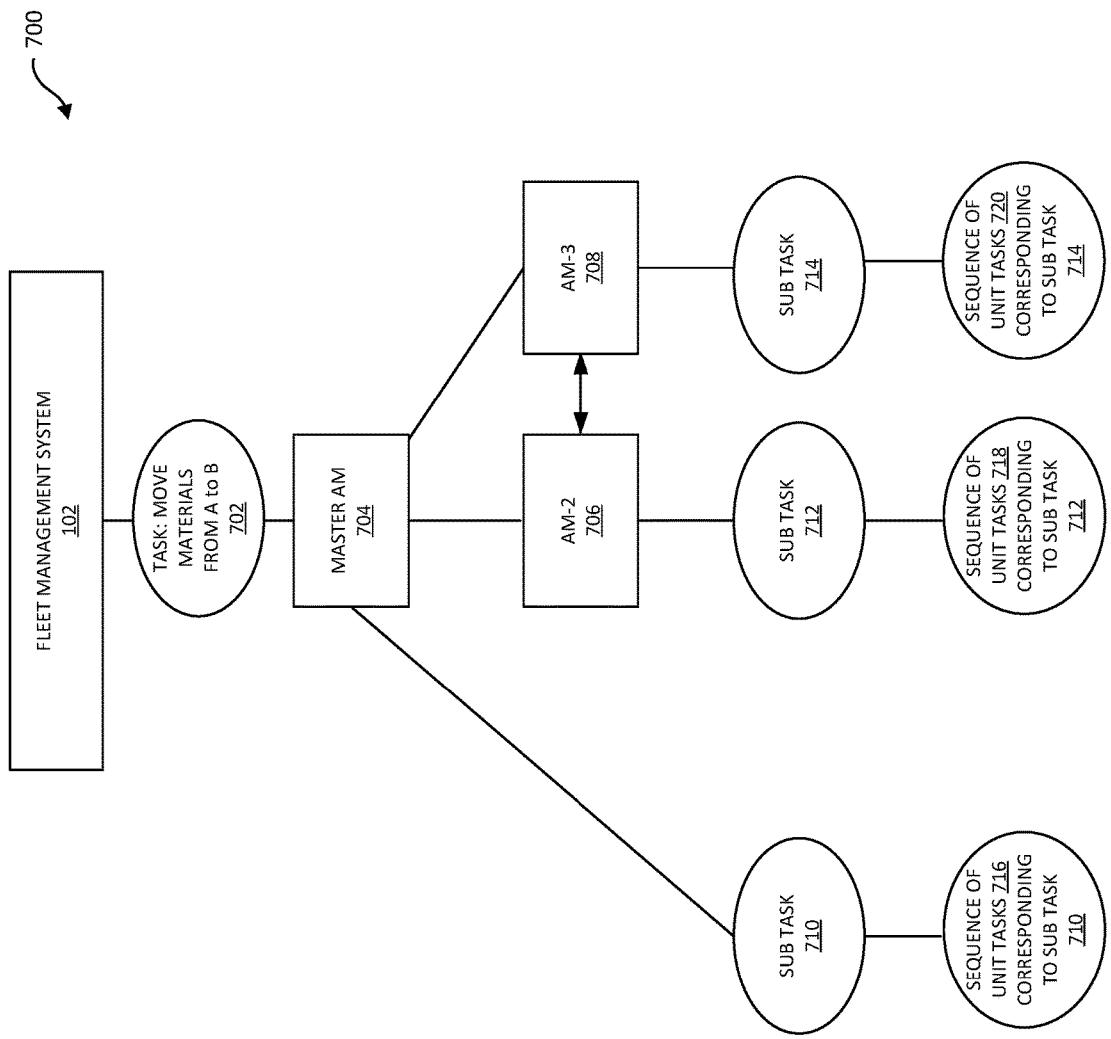
FIG. 7 is an exemplary illustration of execution of a task in master-slave mode according to some embodiments.

FIG. 7 is an exemplary illustration of execution of a task in master-slave mode according to some embodiments. In the illustrated example, the FMS 102 determines a task 702 to be executed: "Move Materials from A to B" to move materials from a specified source location "A" at a site (e.g., a mine site) to a specified destination location "B" within the site. In this example, the FMS 102 identifies a set of AMs 704, 706 and 708 to perform the task and further identifies AM 704 to be a "master AM." In some instances, AM 704 may be configured as a master AM and thus is identified as the master AM by FMS 102. In some other instances, FMS 102 may select AM 704 as the master AM because of its location with respect to FMS 102. For example, the master AM 704 may be positioned such that it is within communication range of FMS 102 (and slave AMs 706 and 708 may be outside this communication range). In yet other instances, AM 704 may be preconfigured as the master AM for the particular task 702 to be performed.

The FMS 102 then communicates or transmits a command to the master AM 704 to execute the task 702. In some instances, the master AM 704 may be located at a first location in the site when it receives information regarding the task to be performed from the FMS 102 and may then have to change its location to a new location in the site that is within communication range of the slave AMs 706 and 708, and then communicate the information received from FMS 102 to the slave AMs. This is all done autonomously by master AM 704. The information communicated from the FMS 102 to the master AM 704 also identifies slave AMs 706 and 708 for performing the task. Other information associated with the task (e.g., the expected time of completion of the task) may also be communicated from FMS 102 to the master AM 704. The master AM 704 receives the information (e.g., command to execute the task) from the FMS 102 and communicates the information or portions thereof to the slave AMs 706 and 708.

As noted above, in some instances, the master AM may itself perform a portion of the task to be performed, such as one or more subtasks. In other instances, the master AM may only be responsible for communicating or relaying the information received from the FMS 102 to the one or more slave AMs and may itself not be involved in the actual performance of the task. For purposes of the example depicted in FIG. 7, it is assumed that the master AM 704 also performs a portion of task 702. Each of the AMs receiving information regarding the task is then configured to determine one or more subtasks associated with the task that the particular AM is to perform. In certain embodiments, this is done per the processing depicted in block 404 in FIG. 4 and described above. As shown in FIG. 7, the master AM 704 determines that it is to perform subtask 710 and performs the subtask 710. As part of performing the subtask, master AM 710 may load one or more libraries related to the subtask and execution of the libraries causes the master AM 710 to perform the subtask. As part of performing subtask 710, master AM 704 may execute a sequence of one or more unittasks 716 corresponding to the subtask 710. In a similar manner, slave AM 706 determines that it is to perform subtask 712. Slave AM 706 may load one or more libraries related to subtask 712 and execution of the libraries causes slave AM 706 to perform subtask 712. As part of performing subtask 712, slave AM 706 may execute a sequence of one or more unit tasks 718 corresponding to subtask 712. Slave AM 708 determines that it is to perform subtask 714 and loads one or more libraries related to subtask 714. Execution of the libraries causes slave AM 708 to perform subtask 714. As part of performing subtask 714, slave AM 708 may execute a sequence of one or more unit tasks 720 corresponding to subtask 714.

In certain examples, the execution of subtasks 710, 712 and 714 may involve communications between two or more of AMs 704, 706, and 708 that are performing the task 702. For example, a unit task performed by an AM (e.g., AM 704, AM 706, or AM 708) may involve communications with another AM performing the task. For example, the communication may be related to a condition check, exchange of status information, etc. between the AMs. These inter-AM communications do not involve the FMS 102 and can thus be performed by the AMs even if FMS 102 is not within communication range of AMs 704, 706, or 708. These inter-AM communications are performed autonomously by the AMs. In this manner, the task, the subtasks, and the unit tasks can be performed by the AMs 704, 706, and 708 without having to communicate with FMS 102.

In certain scenarios, one or more of the unit tasks performed by AMs 704, 706, and 708 may involve communications with FMS 102, for example, sending status updates regarding the subtasks to FMS 102. In situations where unit task involves an AM communicating with FMS 102 and the FMS is out of communication range, the AM may continue with the other unit tasks. The communication to the FMS may be performed whenever the AM is connected to FMS 102. In this manner, the task it not stopped or delayed or adversely impacted due to lack of communication connectivity between by FMS 102 and AMs 704, 706, and 708.

In certain embodiments, the master AM 704 acts as the communication middleman between slave AMs 706 and 708 and FMS 102. For example, when data or messages have to be communicated from a slave AM to the FMS, the slave AM may first communicate the particular data or message first to the master AM, and the master AM may then communicate the particular data or message to FMS 102. For example, master AM 704 may be in a first location where it is in communication range with the slave AMs 706 and 708 but not in communication range with FMS 102 and slave AMs 706 and 708 are also out of communication range with FMS 102. In this first location, the slave AMs 706 and 708 may communicate data or messages intended for FMS 102 to master AM 704. Master AM 704 may then autonomously change its location to a second location where it is able to communicate with FMS. Master AM 704 may then communicate the data/messages received from slave AMs 706 and 708 to FMS 102 when in this second location. In certain embodiments, master AM 704 may collate the data or messages received from slave AMs and then communicate the collated data/messages to FMS 102. This is useful in situations where the master AM can gain communication connectivity to FMS 102 but the slave AMs are not connected to the FMS (e.g., the slave AMs are out of communication range from the FMS). The identification of a master AM 704 by the FMS 102 ensures that the other AMs 706 and 708 can communicate directly with the master AM 704 and with each other to ensure completion of the task even if the AMs 706 and 708 are located on a part of the site that is out of range of communication with the FMS 102.

For example, master AM 704 may be configured to receive status update messages from the slave AMs 706 and 708. The status update messages may be received by the master AM 704 at fixed time intervals (e.g., every hour), at variable time intervals such as, for instance, upon completion of a certain percentage of a subtask, or upon completion of the entire subtask. In certain examples, the status update information may indicate information regarding unexpected events encountered by the slave AMs, the execution of their respective subtasks and unit tasks such as vehicle malfunctions, road blocks, network connectivity issues, route changes and so on.

The master-slave mode of operation offers several benefits for completion of tasks by AMs. The FMS need only be in communication with the master AM, which can then communicate with the slave AMs. The master AM facilitates communications between the FMS and the slave AMs even when the slave AMs cannot communicate with the FMS. Additionally, coupled with inter-AM communications, a task can be performed autonomously by multiple AMs, even when the AMs performing the task cannot communicate with the FMS. In certain embodiments, the AMs cooperate or collaborate with each other in an autonomous manner to complete the task. Each AM is capable of autonomously determining the one or more subtasks that the AM is to perform for the task. Each subtask can translate to a sequence of unit tasks that are performed autonomously by the AM. One or more of the unit tasks can include communications with one or more other AMs involved in performing the task. A task can thus be autonomously completed by the AMs without needing to communicate with the FMS or even when there is no communication connectivity between one or more of the AMs performing the task and the FMS.

The examples described in connection with FIGS. 4-7 describe the execution of a single task by a set of AMs. However, in certain situations, the FMS 102 may identify multiple tasks to be performed, either in parallel or overlapping manner or serially, by a set of AMs. When multiple tasks are to be performed at a site using a set of available resources (e.g., AMs) at the site, the task of allocating resources in an intelligent manner for the various tasks becomes important. The resource allocation processing may be impacted by various factors such as, but not limited to:

The nature of the tasks being performed. For example, digging, hauling, etc.

The nature of the subtasks and unit tasks for each task to be performed, including dependencies between subtasks for a task, or even dependencies between tasks.

The expected time of completion for each task to be performed.

Differences in capabilities of the resources or AMs. For example, different hauling capacities of autonomous trucks, speeds of trucks, loading time of a loader, etc.;

Attributes of the locations on the site where a task is to be performed. For example, grade or incline of the road at the location, presence of obstacles at the location, size of the location that may impact which AMs can be used at the location, etc.;

Differing availabilities of the resources over different time periods. For example, only four trucks are available during the first hour of operation, five trucks become available during the next hour of operation, etc.;

Unexpected incidents that can occur when a task is being performed. For example, breakdown of an AM performing the tasks, incidents that cause delays in an AM completing a task or related subtask.

In certain embodiments, the FMS 102 is configured to perform processing to determine how available resources (e.g., available AMs) are to be allocated for performing the identified tasks. The goal is to allocate available resources optimally such that the tasks are completed as expected and within the expected or given time frame. The FMS 102 is also configured to determine an expected time of completion for each task, and each of the subtasks corresponding to a task. The FMS 102 is configured to check the statuses of the tasks and the subtasks and take corrective actions (e.g., a reallocation of the available AMs) in response to unexpected and/or unplanned events (e.g., a task or subtask or unit task taking much longer to complete compared to expected completion time, breakdown or mechanical failure of an AM, etc.). In certain embodiments, resource allocation related processing is performed by the resource allocation subsystem 206 of the FMS 102.

Figure 8:
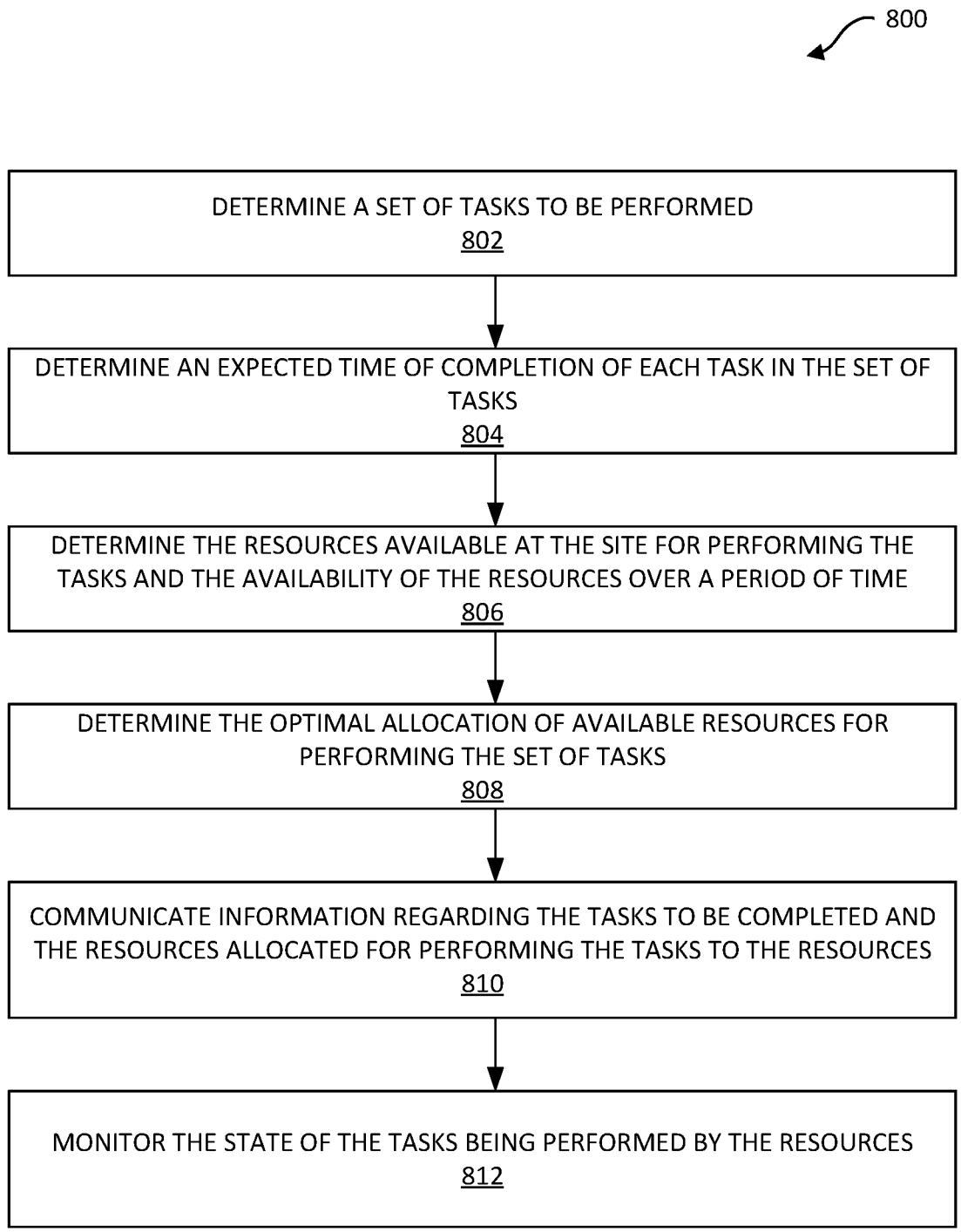
FIG. 8 is a flow chart 800 illustrating a method or operations performed by the FMS for optimal allocation of resources (e.g., AMs), according to certain embodiments.

FIG. 8 is a flow chart 800 illustrating a method or operations performed by the FMS for optimal allocation of resources (e.g., AMs), according to certain embodiments. The processing depicted in FIG. 8 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process presented in FIG. 8 and described below is intended to be illustrative and non-limiting. Although FIG. 8 depicts various processing steps occurring in a particular sequence or order, this is not intended to be limiting. In certain alternative embodiments, the steps may be performed in a different order, certain steps omitted, or some steps performed in parallel. In certain embodiments, such as in the embodiment depicted in FIG. 8, the processing depicted in FIG. 8 may be performed by the resource allocation subsystem 206 of the FMS 102 shown in FIG. 2.

At 802, a set of tasks to be performed at the site are determined by the FMS 102. In certain examples, the set of tasks may represent multiple tasks to be performed in parallel, in an overlapping manner, or sequentially by a set of AMs (e.g., 106A-106N) managed by the FMS 102. For example, the set of tasks may include the movement of materials from various source locations in the site 104 to various destination locations within the site 104.

At 804, the FMS 102 may determine an expected time of completion of each task identified in 802. In certain examples, the resource allocation subsystem 206 of FMS 102 may obtain information related to the expected time of completion of each task from the task information 214 stored in the task-resource data storage system 212.

At 806, the FMS determines the resources (e.g., AMs) available at the site for performing the tasks and, for each resource, the availability of the resource over a period of time (referred to as a "shift"). As part of the processing in 806, the FMS 102 first determines the shift. The shift could be a day or 24 hours period, a 12 hour period, an 8 hour period, a 4 hour period, and so on. In some instances, the shift may correspond to the longest expected time of completion from among the times of completion determined in 803 for the tasks to be performed.

In certain embodiments, as part of the processing in 806, the shift may further be subdivided into smaller time periods (referred to herein as sub periods). Next, as part of the processing in 806, the FMS 102 determines the availability of resources for the shift and for each sub period. In certain examples, FMS 102 may obtain information related to the availability of resources during various time periods from the resource information 216 stored in the task-resource data storage system 212.

Figure 9:
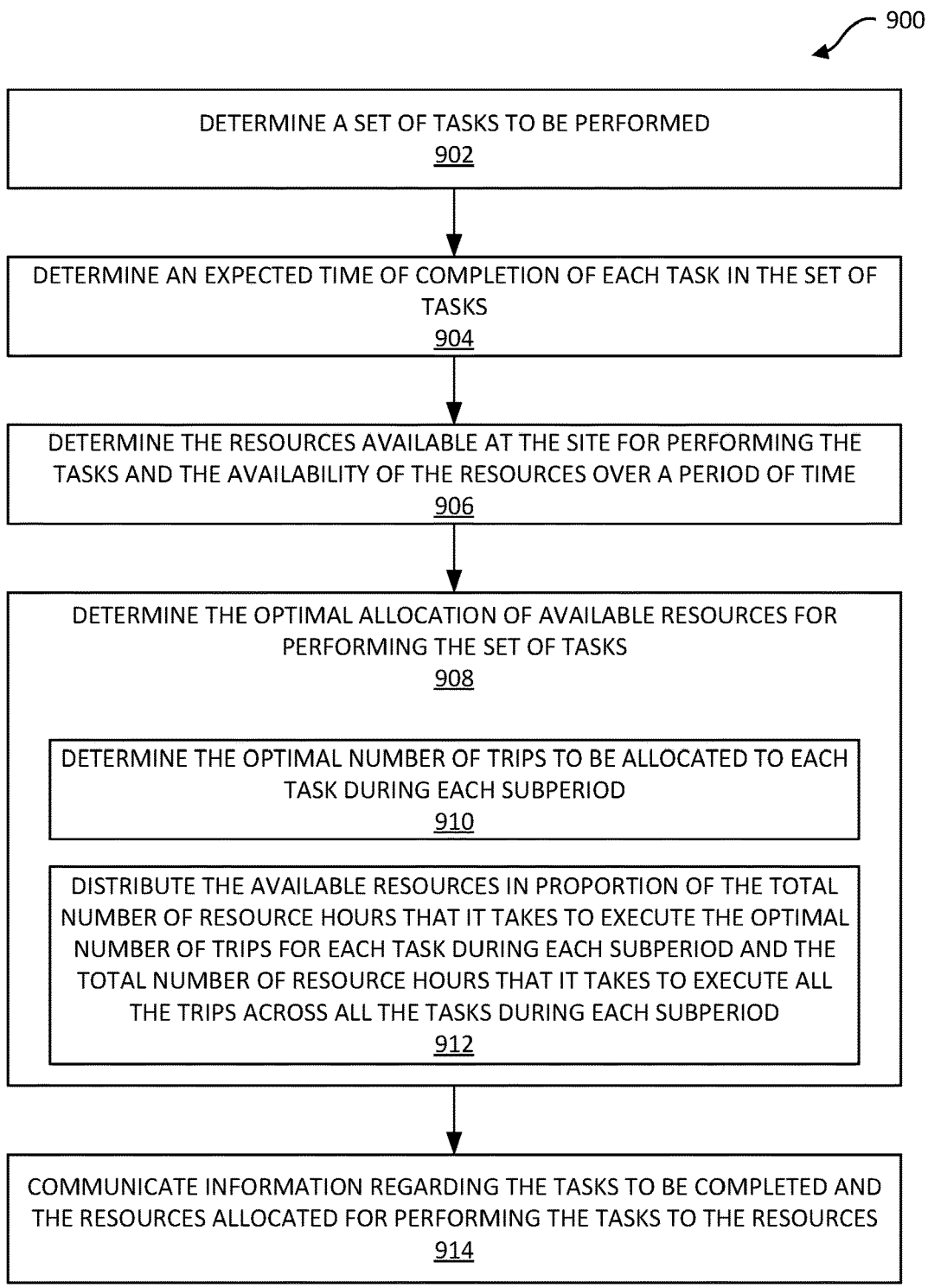
FIG. 9 is a flow chart illustrating a method performed by the FMS for the optimal allocation of a set of AMs for executing a set of tasks that involve the movement of materials within the site, according to certain embodiments

In block 808, based upon the processing performed in 802, 804, and 806, the FMS 102 determines an optimal allocation of available resources for performing the set of tasks identified in 802. Various different programming techniques may be used for determining the optimal allocation in 808. In one embodiment, one or more optimization techniques, such as real-time dynamic programming-based optimization methods are used for determining the optimal allocation. Examples of such optimization techniques include linear and non-linear programming techniques. In certain embodiments, graph theory-based techniques may be used to determine the actual dispatching of resources for a task based on proximity of such resources from the work site. The allocation in 808 is done in real time based upon the real time information, such as the real time status of the site where the tasks are to be performed, the real time availability of the resources, the nature of the tasks being performed (e.g., distances travelled), the capabilities of the available resources, and the like. A resource as described herein may include all machineries e.g., Trucks, Loaders, Excavators, Earth Movers including fully autonomous, semi-autonomous or manual. FIG. 9 describes additional details of the operations performed in block 808 by describing an example of how an optimal allocation of resources (e.g., trucks) can be determined for executing a set of tasks that involve the movement of materials within a site.

In 810, information regarding the tasks to be completed and the resources that have been allocated for performing the tasks for each sub period is communicated from the FMS 102 to the resources (e.g. to the AMs). This may be done as described above using normal mode, master-slave mode, or other mode.

In 812, the FMS 102 monitors the state of the tasks that are being performed by the resources. For example, a resource may use the processing depicted in FIG. 3 and FIG. 4 to perform the tasks, corresponding subtasks, and corresponding unit tasks. This may include monitoring the states of the resources performing the tasks, monitoring the actual times taken to perform the tasks or subtasks, or unit tasks and comparing them with expected completion times, monitoring for any unplanned or unforeseen incidences (e.g., failure of an AM, obstacles that prevent an AM from performing its task or cause a delay in the performance of the task, etc.) Certain states may cause the FMS 102 to go back to 808 and perform a reallocation of certain resources based upon the current state information monitored in 812.

In certain embodiments, the operations 808 performed by the FMS 102 may involve the determination of the optimal allocation of a set of available AMs (e.g., trucks) for executing a set of tasks that involve the movement of materials within the site. FIG. 9 is a flow chart 900 illustrating a method performed by the FMS for the optimal allocation of a set of AMs for executing a set of tasks that involve the movement of materials within the site, according to certain embodiments. The processing depicted in FIG. 9 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process presented in FIG. 9 and described below is intended to be illustrative and non-limiting. Although FIG. 9 depicts various processing steps occurring in a particular sequence or order, this is not intended to be limiting. In certain alternative embodiments, the steps may be performed in a different order, certain steps omitted, or some steps performed in parallel.

In certain embodiments, such as in the embodiment depicted in FIG. 9, the processing depicted in FIG. 9 may be performed by the resource allocation subsystem 206 of the FMS 102 shown in FIG. 2. In certain examples, the various steps of the processing described in FIG. 9 are further explained in relation to FIG. 10 that illustrates an example set of tasks and the determination of an optimal allocation of a set of AMs (i.e., trucks) to execute the set of tasks, according to certain embodiments.

Figure 10:
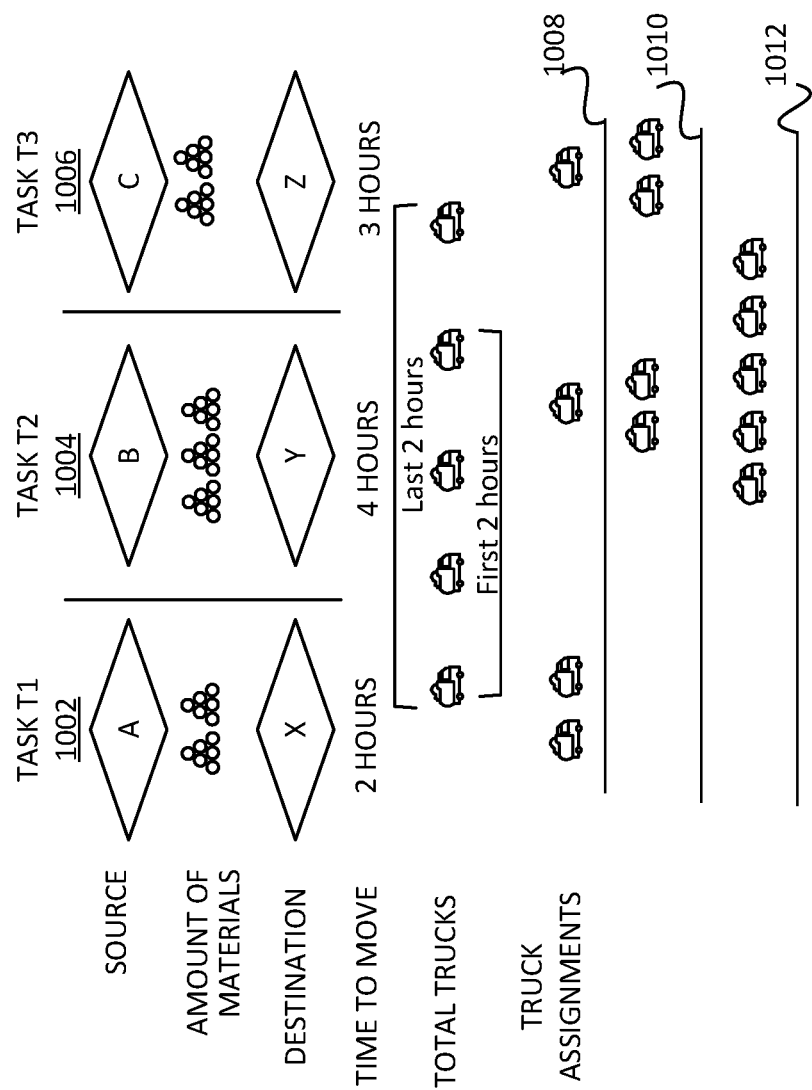
FIG. 10 illustrates an example set of tasks and the determination of an optimal allocation of a set of AMs (i.e., trucks) to execute the set of tasks, according to certain embodiments.

At block 902, the FMS determines a set of tasks to be performed at the site. For example, the FMS may use the processing depicted in block 802 (described in FIG. 8) to determine the set of tasks to be performed. The example shown in FIG. 10 illustrates three tasks T1 1002, T2 1004, and T3 1006 to be started at the same time and to be performed or executed by a set of AMs (i.e., trucks) managed by the FMS 102. The tasks T1, T2, and T3 involve the movement of materials from various source locations in the site 104 to various destination locations within the site 104. For instance, task T1 involves the movement of a first amount of material (e.g., 12 pieces of material (two stacks of 6 materials each)) from a source A to a destination X within the site. Task T2 involves the movement of a second amount of material (e.g., 18 pieces of material) from a source B to a second destination Y within the site, and task T3 involves the movement of a third amount of material (12 pieces of material) from a source C to a destination Z in the site.

At block 904, the FMS 102 determines an expected time of completion of each task identified in 902. In certain examples, and as noted above, the resource allocation subsystem 206 of FMS 102 may obtain information related to the expected time of completion of each task from the task information 214 stored in the task-resource data storage system 212. Referring to the example shown in FIG. 10, the expected time of completion of task T1 is 2 hours, the expected time of completion of task T2 is 4 hours, and the expected time of completion of task T3 is 3 hours.

At 906, the FMS determines the resources (e.g., AMs) available at the site for performing the tasks and, for each resource, the availability of the resource over a period of time (referred to as a "shift"). For example, the FMS may use the processing depicted in block 806 (described in FIG. 8) to determine the resources available at the site for performing the tasks and the availability of the resources over the period of time. For example, for the example depicted in FIG. 10, the shift may be determined to be 4 hours (time for completing task T2) since that is the longest time of completion from among tasks T1, T2, and T3. The shift is further divided into three subperiods: a first subperiod of 2 hours, a second subperiod of 1 hour, and a third subperiod of 1 hour. The division of a shift into subperiods enables allocation of resources to be performed at a more granular subperiod level. As seen from the example in FIG. 10, the subperiods can be of different time lengths.

Next, as part of the processing in 906, the FMS 102 determines availability of resources for the shift and for each subperiod. For the example depicted in FIG. 10, FMS 102 determines that a total of five resources (5 trucks) are available for performing tasks for the shift (i.e., for the 4 hour shift). The FMS 102 further determines that four of the five trucks are available during the first subperiod (i.e., the first two hours) and that all five trucks are available during the second subperiod (e.g., the next hour), and during the third subperiod (e.g., during the 4$^{th}$ hour of the shift). In certain examples, the FMS 102 may obtain information related to the availability of resources during various time periods from the resource information 216 stored in the task-resource data storage system 212.

In block 908, based upon the processing performed in 902, 904, and 906, the FMS 102 determines an optimal allocation of available AMs for performing the set of tasks identified in 902. In certain embodiments, the processing performed in 908, involves determining, at block 910, an optimal number of trips to be made to execute each task during each subperiod and distributing the available resources during each time period in proportion to the total number of resource hours that it takes to execute the optimal number of trips for each task during each time period and the total number of resource hours that it takes to execute all the trips across all the tasks during each time period at block 912.

In certain embodiments, as part of block 910, the FMS 102 is configured to determine the optimal number of trips to be made by the set of available resources to execute each task during each subperiod based on the following information:

(1) The total available resource hours during each subperiod. Continuing with the example illustrated in FIG. 10, if the FMS determines that 4 of a total of 5 resources (autonomous trucks) are available during a first subperiod (e.g., the first two hours), then the total available resource hours available during that subperiod is determined to be 8 (4*2) resource hours.

(2) The expected time of completion of the task. This information may be determined based on the task information 214 stored in the task-resource data storage subsystem 212. For the example shown in FIG. 10, the expected time of completion of task T1 is 2 hours, the expected time of completion of task T2 is 4 hours and the expected time of completion of task T3 is 3 hours.

(3) The total amount of materials to be transported by each task. For the example shown in FIG. 10, task T1 has to transport 12 pieces of material from source location A to destination location X, task T2 has to transport 18 pieces of material between source location B to destination location Y and task T3 has to transport 12 pieces of material from source location C to destination location Z.

(4) The amount of time it takes an AM (i.e., a truck) to complete a trip. For the example shown in FIG. 10, the amount of time it takes a truck to complete a trip is assumed to be 15 minutes.

(5) The amount of material that each truck can transport in each trip. For the example shown in FIG. 10, the amount of material that each truck can transport is assumed to be one piece of material per trip.

Based on the above parameters, the FMS 102 determines the optimal number of trips to be made by the set of available resources (i.e., 4 trucks) to execute each of the tasks T1, T2 and T3 during the first subperiod TP1 1008. The determination of the optimal number of trips may be formulated as an optimization function that seeks to minimize the difference between the total available resource hours during a subperiod and the total number of resource hours required to execute the optimal number of trips for each task during the subperiod.

In one implementation, the optimal solution seeks to minimize the difference between the total available resource hours during a subperiod and the total number of resource hours that it takes to execute the optimal number of trips for each task during the subperiod (i.e., the objective function) subject to a set of constraints. In one example, the optimization problem may be formulated as shown in equation (1) below, where the various components in equation (1) are identified and described in Table A:

TABLE A

| Variable | Description |
| --- | --- |
| N | Number of Sources |
| K | Number of Destinations |
| t | Number of longest time windows when everything e.g., tasks, available resources is unchanged |
| $T_1$ | Number of Available Trucks in the $1^{th}$ time window $1 = 1\,(1)t$ |
| $N_1$ | Number of Source-Destination pair in the $1^{th}$ time window $1 = 1\,(1)t$ |
| $M_{ij}$ | Amount of materials to be moved from Source i and Destination j, j; $i = 1(1)N$, $j = 1(1)K$ |
| $D_{ij}$ | Distance between Source i and destination j; $i = 1(1)N$, $j = 1(1)K$ |
| $SL_{ij}$ | Average Speed of loaded Trucks between Source i and destination j; $i = 1(1)N$, $j = 1(1)K$ |
| $SUL_{ij}$ | Average Speed of unloaded Trucks between destination j and source i; $i = 1(1)N$, $j = 1(1)K$ |
| m | Hauling capacity of Trucks |
| mX | loading capacity of excavator/loader |
| Id | loading time(in minutes) |
| tp | tipping time(in minutes) |
| MTS | Maximum number of Trips serviceable at Source in an hour = 60/Id |
| MTD | Maximum number of Trips serviceable at Destination in an hour = 60/tp |

In certain embodiments, the computation of the optimal number of trips to execute a set of tasks during a subperiod is shown below in Table B:

TABLE B

Unknown: $X_{ij1}$ = Number of trips allocated between Source i and destination j in the 1 time window
$i = 1(1)N$
$j = 1(1)K$
$1 = 1(1)t$
Total trips required for i-j source-destination task, $L_{ij}$ = Quotient $[M_{ij}/(m)] + 1$
Time Taken for completing required trips in $t^{th}$ time window which is sum total of loading time, tipping time, onward and back travel time across all trips, $Time_1 = X_{ij}\,(1d + tp + Dy/SL_{ij} + Dy/SUL_{ji}) * X_{ij1}$ In one example, the optimization function may be represented as shown in equation (1) below:

Find integer $X_{ij1}$ to Minimize $\Sigma_1(Time_1 - T_1 * 1^{th}$ time window in hours)$^2$    Equation (1):

which is square of the difference between required resource time for all tasks and available resource time. The square function is used for nice mathematical properties.
Subject to
1. $\Sigma_1 X_{ij1} = L_{ij}$; summing over all time windows: total number of trips matching the required number of trips
2. $Time_1 <= Time$ window (in Hours)$*T_1$ for all 1: total time taken not exceeding the target time
3. $X_{ij1}/1^{th}$ Time Window (in hours)$<=$MTS, for all i, j, 1: total trips not exceeding service capacity at source
4. $X_{ij1}/1^{th}$ Time Window (in hours)$<=$MTD, for all i, j, 1: total trips not exceeding service capacity at destination For instance, for the illustrated example shown in FIG. 10, one optimal solution that seeks to minimizes the objective function (i.e., the difference between the total available resource hours during a subperiod and the total number of resource hours required to execute the optimal number of trips for each task during the subperiod) can be determined as follows. Using the illustration shown in FIG. 10, it may be observed that a total of 32 pieces of material need to be transported by tasks T1, T2 and T3 in the first 2 hours (i.e., in the first time subperiod) by 4 trucks working together. Since the expected time of completion of task T1 is 2 hours and the task involves the movement of 12 pieces of material from a source A to a destination X and the amount of time it takes each truck to complete a trip is 15 minutes, one feasible optimal solution determined by FMS 102 is to assign a total of 12 trips to task T1 so that task T1 can complete its execution within its expected time of 2 hours during the first subperiod TP1. A total of 12 trips thus results in the utilization of 3 truck hours for the execution of task T1 during the first subperiod. The feasible solution may then determine the number of trips to be assigned to the remaining tasks T2 and T3 for the remaining amount of 5 truck hours available during the first subperiod. For instance, since task T2 is required to be executed in 4 hours and it is required to transport a total of 18 pieces of material, one feasible solution may be to assign 9 trips to T2 because T2 is required to transport at least half the amount of material (9 pieces) in the first subperiod (i.e., 2 hours). Similarly, since task T3 is required to be executed in 3 hours and it is required to transport a total of 12 pieces of material, one feasible solution may be to assign 8 trips to T3 because T3 is required to transport at least 1.5 times the amount of material (8 pieces) in the first subperiod (i.e., two hours).

The FMS 102 then attempts to determine the optimal solution that minimizes the objective function (i.e., the difference between the total available resource hours during a subperiod and the total number of resource hours required to execute the optimal number of trips for each task during the subperiod) subject to a set of constraints as described in equation (1) above.

In certain embodiments, as part of 912, the FMS 102 distributes the available resources during each time period in proportion to the total number of resource hours that it takes to execute the optimal number of trips for each task during each subperiod and the total number of resource hours that it takes to execute all the trips across all the tasks during each subperiod. In one implementation, the number of resources to be distributed for the execution of each task during each subperiod is computed as shown in Equation (2) below:

Number of Trucks assigned to the i-j task in $1^{th}$ time
window=$T_1 \cdot [(Id+tp+D_{ij}/SL_{ij}+D_{ij}/SUL_{ji})*X_{ij1}]$
$*\Sigma_{i,j}[(Id+tp+D_{ij}/SL_{ji}+D_{ij}/SUL_{ji})*X_{ij1}]$    Equation (2):

As shown in Equation (2), the tasks are assigned in proportion of total resource hours needed to do i-j task in comparison to all other tasks. Hence, the available resources during each time period are distributed in proportion of the number of resource hours (operational time) needed to complete optimized number of trips for i-j task and the total number of resource hours (total operational time) needed to execute all trips across all tasks in the given window (i.e., subperiod) multiplied with the total number of available trucks.

For instance, for the example illustrated in FIG. 9, if the optimal solution results in 3 resource hours required to execute the optimal number of trips for task T1, 2 resource hours required to execute the optimal number of trips for task T2, and 2 resource hours required to execute the optimal number of trips for task T3. The distribution of the number of available resources for each task T1, T2 and T3 during the first subperiod will result in a distribution of:
 $3/7^{th}$ of the resources (approximately 2 trucks) being allocated to execute T1,
 $2/7^{th}$ of the resources (approximately 1 truck) to execute T1, and
 $2/7^{th}$ of the resources (approximately 1 truck) being allocated to execute T3 in the first subperiod TP1, as indicated in the illustration shown in FIG. 10.

In certain embodiments, the FMS 102 may repeat the process of determining the optimal number of trips to be made to execute each task and distribute the available resources during the remaining subperiods TP2 and TP3 until all the tasks are executed within their expected completion times while ensuring that all the available resources in the given time period are completely utilized. In the example shown in FIG. 10, the FMS 102 distributes two trucks to task 2 and two trucks to task 3 during a second subperiod 1010 and distributes 5 trucks to complete execution of task 3 during a third subperiod 1012 to ensure completion of all the tasks T1, T2 and T3 within their expected times of completion.

In 914, information regarding the tasks to be completed and the resources that have been allocated for performing the tasks for each sub period is communicated from the FMS 102 to the resources (e.g. to the AMs). This may be done as described above using normal mode, master-slave mode, or other mode.

In certain examples, the resource allocation subsystem 208 may generate an output comprising information related to each task executed during each time period based on the determination of the optimal number of trips (e.g., from Equation 1) and the determination of the distribution of the available resources during each subperiod (e.g., Equation 2). Table C is an exemplary illustration of the information that is output for a set of tasks that involve the movement of a set of materials from various source locations to different destination locations at different time periods.

TABLE C

| Time Interval | Source Location | Destination Location | Amount of Materials to be moved (in tons) | Trucks Assigned | Percentage of Material moved |
|---|---|---|---|---|---|
| 6:00 AM-7:00 AM | A | X | 1,167,005 | 2 | 5% |
| | B | Y | 2,632,681 | 6 | 11% |
| | C | Z | 1,524,739 | 2 | 9% |
| 7.00 AM-11.30 AM | A | X | 1,167,005 | 2 | 35% |
| | B | Y | 2,632,681 | 5 | 38% |
| | C | Z | 1,524,739 | 2 | 35% |
| | E | T | 1,206,645 | 5 | 100% |
| | D | S | 2,632,681 | 3 | 39% |
| 11.30 AM-2.00 PM | A | X | 1,167,005 | 2 | 16% |
| | B | Y | 2,632,681 | 4 | 18% |
| | C | Z | 1,524,739 | 2 | 21% |
| | D | S | 2,632,681 | 3 | 21% |
| | H | W | 800,647 | 6 | 99% |

In the example table above, the table is organized into one or more columns including:

First Column: A time interval column that indicates various subperiods during which the tasks are executed;

Second Column: A source location column that indicates specific source locations within a site from where the materials are to be picked up and transported using autonomous vehicles;

Third Column: A destination location column that indicates specific destination locations within the site where the picked up materials are to be hauled to and dropped off;

Fourth Column: A column indicating the amount of materials to be moved between a particular source location (identified in the second column) and a destination location (identified in the third column) within the site;

Fifth column: A column indicating the number of trucks assigned to each task during each subperiod;

Sixth Column: A column indicating the percentage of material moved as a result of execution of a task during a specific subperiod.

For example, per TABLE C, for the time interval 6:00-7:00 AM, portions of three tasks were performed (tasks: (1) A to X; (2) B to Y, and (3) C to Z). In this first time subperiod:

Two trucks were assigned to the A-to-X task and resulted in 1,167,005 tons of materials being moved, which represents 5% of the materials being moved.

Six trucks were assigned to the B-to-Y task and resulted in 2,632,681 tons of materials being moved, which represents 11% of the materials being moved.

Two trucks were assigned to the C-to-Z task and resulted in 1,524,739 tons of materials being moved, which represents 9% of the materials being moved.

It is to be noted from TABLE C that several of the tasks were spread out and performed across multiple time subperiods with different truck assignments between the subperiods for the same task. For example, task B-to-Y was performed between 6-7 AM with six trucks assigned to the task, between 7-11:30 AM with five trucks assigned to the task, and between 11:30 AM-2 PM with four trucks assigned to the task. Task H-to-W was only performed in the 11:30 AM-2 PM time subperiod with 6 trucks being assigned to the task. The availability of trucks was also different for different time subperiods.

The illustrated Table C is merely an example and is not intended to unduly limit the scope of claimed embodiments. One of ordinary skill in the art would recognize many possible variations, alternatives, and modifications. For example, in some implementations, the table can be implemented using more or fewer columns than those shown in TABLE C, may combine two or more columns of information, or may have different columns than shown in the illustration.

Figure 11:
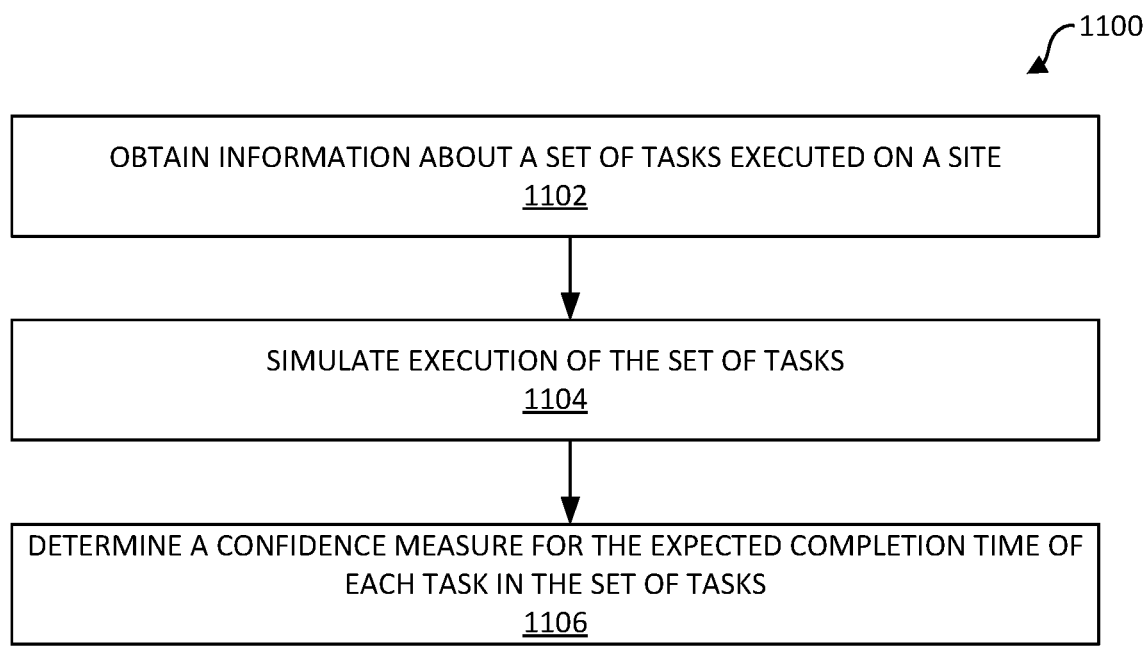
FIG. 11 is a flow chart illustrating a method or operations performed by the FMS for simulating tasks to be performed on a site, according to certain embodiments.

FIG. 11 is a flow chart 1100 illustrating a method or operations performed by the FMS for simulating tasks to be performed on a site, according to certain embodiments. The processing depicted in FIG. 11 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process presented in FIG. 11 and described below is intended to be illustrative and non-limiting. Although FIG. 11 depicts various processing steps occurring in a particular sequence or order, this is not intended to be limiting. In certain alternative embodiments, the steps may be performed in a different order, certain steps omitted, or some steps performed in parallel. In certain embodiments, such as in the embodiment depicted in FIG. 11, the processing depicted in FIG. 11 may be performed by the task simulation subsystem 208 of the FMS 102 shown in FIG. 2.

At block 1102, the task simulation subsystem 208 obtains information about the set of tasks executed on a site. The information may include, for instance, information about the site such as a detailed map of the site, coordinates of various locations within the site, the elevation of the various locations, distances between the locations, and so on. The information may include, for instance, historical data (priori data) such as service history data related to the resources (i.e., the AMs), capabilities of the AMs (e.g., capabilities provided by the manufacturers of the AMs), machine/vehicle breakdown history, the time taken to execute tasks, past occurrences of unexpected events during the execution of tasks such as falling rocks, site flooding and so on. Examples of vehicle history data may include vehicle service history, vehicle breakdown records, speed restrictions of vehicles, vehicle data including load capacity, speed restrictions, dumping time, vehicle capability such as autonomous/manual and the like.

At block 1104, the task simulation subsystem 208 simulates the execution of the set of tasks. In certain embodiments, the task simulation subsystem 208 may employ various simulation tools and techniques (e.g., Monte Carlo simulation) to simulate the execution of the set of tasks. As part of the operations performed at block 1104, the task simulation subsystem 208 may determine an expected completion time of each task in the set of tasks. Various simulation models and techniques may be used for performing the simulation in 1104.

At block 1106, the task simulation subsystem 208 determines a confidence measure for the expected completion time of each task in the set of tasks. In certain examples, the confidence measure indicates a level of accuracy (value between 0-1) of the estimation of the expected completion time of a task determined by the task simulation subsystem. For example, a confidence measure of 0.9 indicates a high accuracy of the expected completion time of a task. In certain embodiments, the resource allocation subsystem 206 can use the confidence measure associated with a task to determine if the execution of the task is progressing as expected and can take corrective actions (e.g., perform a reallocation of the available AMs) in response to the task or a subtask or unit task related to the task taking much longer to complete compared to its expected completion time.

While the processing depicted in FIG. 11 and described above is performed at the granularity of task, the teachings of the processing can also be applied at the subtask level, or even, in certain embodiments, at the unit task level. For example, simulations may be performed for one or more subtasks or unit tasks to determine expected completion times for the subtasks and unit tasks. In certain embodiments, the expected completion times determined for unit tasks from the simulations may be used to determine an expected completion time for a subtask. Likewise, expected completion times determined for subtasks corresponding to a task may be used to determine the expected completion time for the task.

Figure 12:
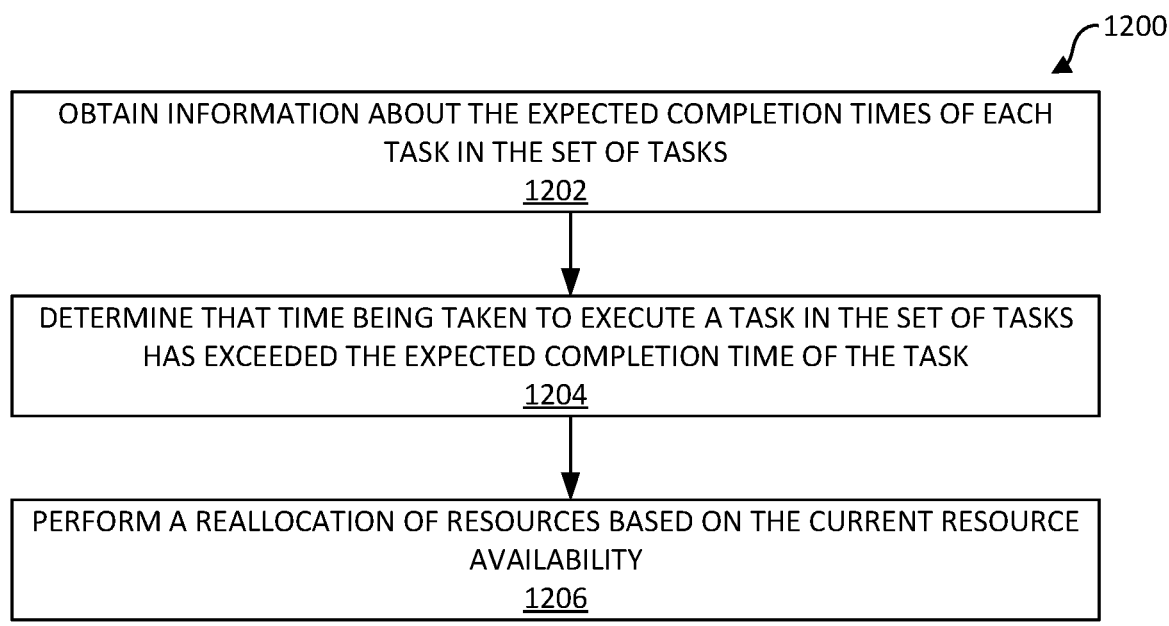
FIG. 12 is a flow chart illustrating a method or operations performed by the FMS for handling deviations between an expected completion time and an actual completion time of a set of tasks during task execution, according to some embodiments.

FIG. 12 is a flow chart 1200 illustrating a method or operation performed by the FMS for handling deviations between an expected completion time and an actual completion time of a set of tasks during task execution, according to some embodiments. The processing depicted in FIG. 12 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process presented in FIG. 12 and described below is intended to be illustrative and non-limiting. Although FIG. 12 depicts various processing steps occurring in a particular sequence or order, this is not intended to be limiting. In certain alternative embodiments, the steps may be performed in a different order, certain steps omitted, or some steps performed in parallel. In certain embodiments, such as in the embodiment depicted in FIG. 12, the processing depicted in FIG. 12 may be performed by the FMS 102 to track a real state of a set of tasks against a simulated state to ensure that the tasks are executed in a timely manner.

At block 1202, the FMS obtains information about the expected completion times of each task in a set of tasks being executed by a set of resources on the site. For instance, this information may be obtained by the FMS by the task simulation subsystem 208 as discussed in FIG. 11.

At block 1204, the FMS monitors the current state of the resources performing the set of tasks. In certain examples, the processing in block 1204 may include determining if the time being taken to execute a task has exceeded the expected completion time of the task.

If the time taken to execute a task has exceeded the expected completion time of the task, then in some examples, at block 1206, the FMS performs a reallocation of resources (AMs) based upon current resource availability to ensure completion of the task without causing significant delays.

While the processing depicted in FIG. 12 and described above is performed at the granularity of task, the teachings of the processing can also be applied at the subtask level, or even, in certain embodiments, at the unit task level. For example, the FMS may monitor the times taken for performance of the subtasks or unit tasks and take appropriate corrective actions.

Figure 13:
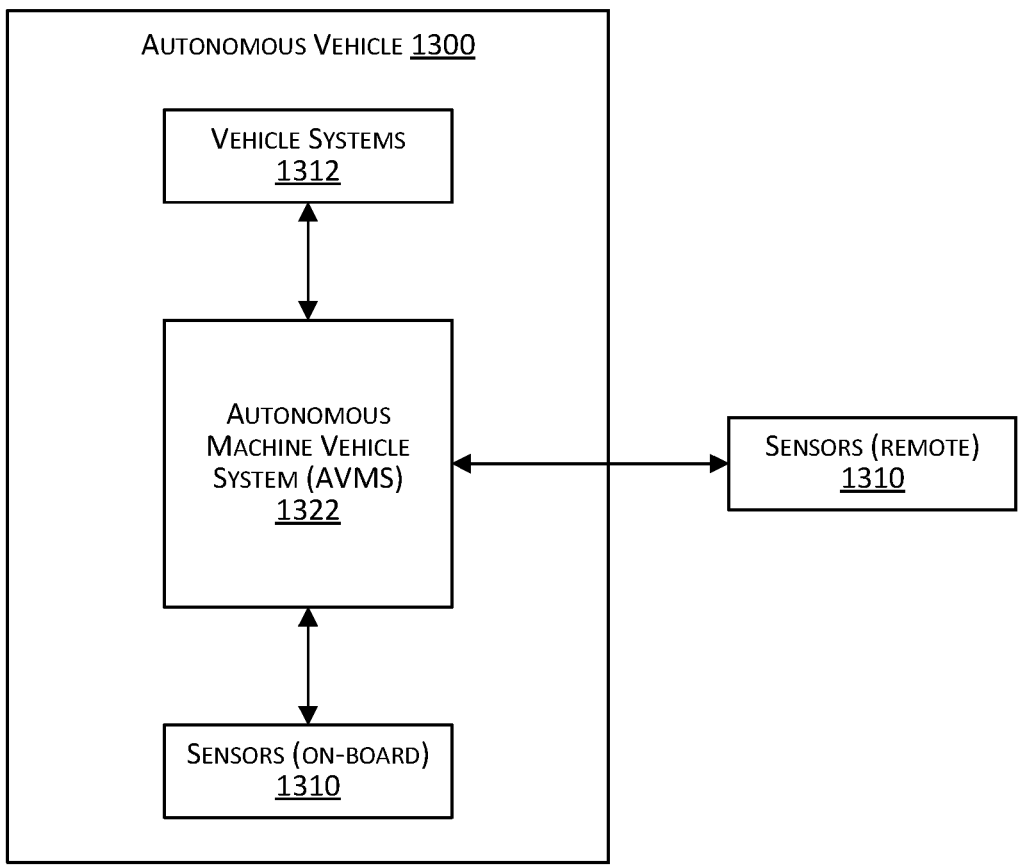
FIG. 13 is a simplified block diagram of an AV incorporating a controller system (referred to herein as an autonomous vehicle management system (AVMS)) according to certain embodiments.

FIG. 13 is a simplified block diagram of an AV 1300 incorporating a controller system (referred to herein as an autonomous vehicle management system (AVMS) 1322) according to certain embodiments.

Autonomous vehicle 1300 can be of various different types. For example, autonomous vehicle 1300 can be a car or mobile machine that can be used to transport people and/or cargo. Since the environment of autonomous vehicle 1300 can include other vehicles, including other autonomous vehicles, for purposes of clarity, in order to differentiate autonomous vehicle 1300 from other vehicles in its environment, autonomous vehicle 1300 is also sometimes referred to as the ego vehicle.

As depicted in FIG. 13, in addition to autonomous vehicle management system 1322, autonomous vehicle 1300 may include or be coupled to sensors 1310, and vehicle systems 1312. Autonomous vehicle management system 1322 may be communicatively coupled with sensors 1310 and vehicle systems 1312 via wired or wireless links. One or more different communication protocols may be used for facilitating communications between autonomous vehicle management system 1322 and sensors 1310 and between autonomous vehicle management system 1322 and vehicle systems 1312.

Vehicle systems 1312 can include various electro-mechanical systems, components, linkages, etc. that enable autonomous vehicle 1300 to perform its intended functions such as traveling or navigating along a particular path or course. Vehicle systems 1312 may include for example, a steering system, a throttle system, a braking system, a propulsion system, etc. for driving the autonomous vehicle, electrical systems, auxiliary systems (e.g., systems for outputting information to a driver or passenger of autonomous vehicle 1300), and the like. Vehicle systems 1312 can be used to set the path and speed of autonomous vehicle 1300.

Sensors 1310 may be located on or in autonomous vehicle 1300 ("onboard sensors") or may even be located remotely ("remote sensors") from autonomous vehicle 1300. Autonomous vehicle management system 1322 may be communicatively coupled with remote sensors via wireless links using a wireless communication protocol. Sensors 1310 can obtain environmental information for autonomous vehicle 1300. This sensor data can then be fed to autonomous vehicle management system 1322. Sensors 1310 can include, for example, one or more of the following types of sensors and, for each type of sensor, one or more instances of that sensor type: LIDAR sensors, radar sensors, ultrasonic sensors, cameras (different kinds of cameras with different sensing capabilities may be used), Global Positioning System (GPS) and Inertial Measurement Unit (IMU) sensors, Vehicle-to-everything (V2X) sensors, audio sensors, and the like. Sensors 1310 can obtain (e.g., sense, capture) environmental information for autonomous vehicle 1300 and communicate the sensed or captured sensor data to autonomous vehicle management system 1322 for processing.

Examples of radar sensors (i.e. long range radar, short range radar, imaging radar etc.) may include sensors that are used to detect objects in the environment of autonomous vehicle 1300 and to determine the velocities of the detected objects. Examples of LIDAR sensors include sensors that use surveying techniques that measure distances to a target by using light in the form of a pulsed laser light. This is done by illuminating the target to be measured with pulsed laser light and measuring the reflected pulses using the sensor. Examples of V2X sensors include sensors that use V2X communication technology to communicate with moving parts of a traffic system. For example, autonomous vehicle 1300 may use a V2X sensor for passing and/or receiving information from a vehicle to another entity around or near the autonomous vehicle. A V2X communication sensor/system may incorporate other more specific types of communication infrastructures such as V2I (Vehicle-to-Infrastructure), V2V (Vehicle-to-vehicle), V2P (Vehicle-to-Pedestrian), V2D (Vehicle-to-device), V2G (Vehicle-to-grid), and the like. An IMU sensor may be an electronic device that measures and reports a body's specific force, angular rate, and sometimes the magnetic field surrounding the body, using a combination of accelerometers, gyroscopes, magnetometers, etc. GPS sensors use a space-based satellite navigation system to determine geolocation and time information.

Autonomous vehicle management system 1322 (also referred to as a controller system) is configured to process data describing the state of autonomous vehicle 1300 and the state of the autonomous vehicle's environment, and based upon the processing, control one or more autonomous functions or operations of autonomous vehicle 1300. For example, autonomous vehicle management system 1322 may issue instructions/commands to vehicle systems 1312 to programmatically and autonomously control various aspects of the autonomous vehicle's motion such as the propulsion, braking, steering or navigation, and auxiliary behavior (e.g., turning lights on) functionality of autonomous vehicle 1300. Autonomous vehicle management system 1322 implements the control and planning algorithms that enable autonomous vehicle 1300 to perform one or more operations autonomously.

Autonomous vehicle management system 1322 may be implemented using software only, hardware only, or combinations thereof. The software may be stored on a non-transitory computer readable medium (e.g., on a memory device) and may be executed by one or more processors (e.g., by computer systems) to perform its functions. In the embodiment depicted in FIG. 13, autonomous vehicle management system 1322 is shown as being in or on autonomous vehicle 1300. This is however not intended to be limiting. In alternative embodiments, autonomous vehicle management system 1322 can also be remote from autonomous vehicle 1300.

Autonomous vehicle management system 1322 receives sensor data from sensors 1310 on a periodic or on-demand basis. Autonomous vehicle management system 1322 uses the sensor data received from sensors 1310 to perceive the autonomous vehicle's surroundings and environment. Autonomous vehicle management system 1322 uses the sensor data received from sensors 1310 to generate and keep updated a digital model that encapsulates information about the state of autonomous vehicle and of the space and environment surrounding autonomous vehicle 1300. This digital model may be referred to as an internal map, which encapsulates the current state of autonomous vehicle 1300 and its environment. The internal map along with other information is then used by autonomous vehicle management system 1322 to make decisions regarding actions (e.g., navigation, braking, acceleration, etc.) to be performed by autonomous vehicle 1300. Autonomous vehicle management system 1322 may send instructions or commands to vehicle systems 1312 to cause the actions to be performed by the systems of vehicles systems 1312.

Figure 14:
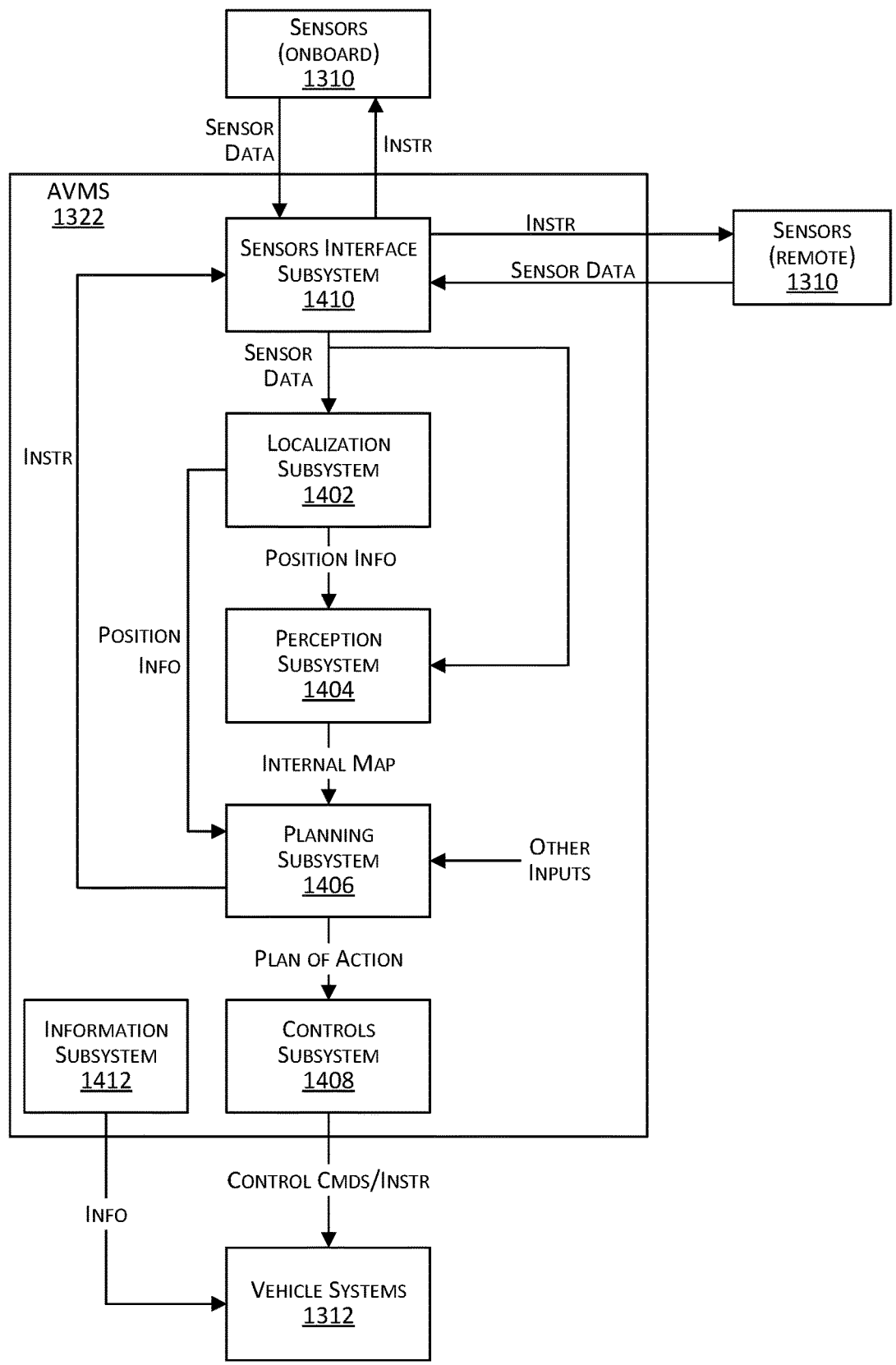
FIG. 14 is a simplified block diagram depicting subsystems of an autonomous vehicle management system according to certain embodiments.

FIG. 14 is a simplified block diagram depicting subsystems of an autonomous vehicle management system according to certain embodiments. Autonomous vehicle management system 1322 may comprise multiple systems or subsystems communicatively coupled to each other via one or more communication channels. In the embodiment depicted in FIG. 14, the subsystems include a sensors interface subsystem 1410, a localization subsystem 1402, a perception subsystem 1404, a planning subsystem 1406, a controls subsystem 1408, and an information subsystem 1412.

Autonomous vehicle management system 1322 embodiment depicted in FIG. 14 is merely an example and is not intended to unduly limit the scope of claimed embodiments. One of ordinary skill in the art would recognize many possible variations, alternatives, and modifications. For example, in some implementations, autonomous vehicle management system 1322 may have more or fewer subsystems or components than those shown in FIG. 14, may combine two or more subsystems, or may have a different configuration or arrangement of subsystems. The subsystems may be implemented using software only, hardware only, or combinations thereof.

Sensors interface subsystem 1410 provides an interface that enables communications between sensors 1310 (including on-board sensors and remote sensors) and autonomous vehicle management system 1322. Sensors interface subsystem 1410 may receive sensor data from sensors 1310 and provide the data to one or more other subsystems of autonomous vehicle management system 1322. For example, as depicted in FIG. 14, sensor data may be provided to localization subsystem 1402 and perception subsystem 1404 for further processing. The sensor data collected by the various sensors 1310 enables autonomous vehicle management system 1322 to construct a view or picture of autonomous vehicle 1300 and its surrounding environment.

In certain embodiments, autonomous vehicle management system 1322 enables one or more subsystems of autonomous vehicle management system 1322 to send instructions or commands to one or more sensors 1310 to control the operations of the one or more sensors. For example, instructions may be sent to a particular sensor to change the behavior of the particular sensor. For example, instructions may be sent to a sensor to change the information sensed or collected by the sensor and/or to change the sensor data communicated from the sensor to autonomous vehicle management system 1322. Using these instructions, autonomous vehicle management system 1322 can dynamically control the sensor data that is communicated from sensors 1310 to autonomous vehicle management system 1322. Further details on this are provided below in the context of functions performed by planning subsystem 1406.

Localization subsystem 1402 is configured to receive sensor data from sensors 1310, and based upon the sensor data, identify the location of autonomous vehicle 1300 in its surrounding environment (vehicle localization). Localization subsystem 1402 provides current, local position information of the ego vehicle with respect to its environment (example: mine). The position of the ego vehicle 1300 may be determined with respect to a pre-defined map that is generated by perception subsystem 1404. In certain embodiments, localization subsystem 1402 is configured to broadcast the ego vehicle's position information to other systems or subsystems of autonomous vehicle 1300. The other systems or subsystems may then use the position information as needed for their own processing.

Localization subsystem 1402 may implement various functions such as internal map management, map matching, visual odometry, dead reckoning, location history management, and the like. For example, assume that autonomous vehicle 1300 is driving in a city. Localization subsystem 1402 may receive as input a map of the city, the map including information on a route (e.g., streets along the route). Localization subsystem 1402 may determine the position of the ego vehicle along the route. Localization subsystem 1402 may do so by utilizing multiple inputs it receives from sensors and maps of the environment. Localization subsystem 1402 may use GPS sensor data to determine the global positioning of the ego vehicle. Localization subsystem 1402 may receive the GPS sensor data and translate it to a more useful form that is usable by one or more other subsystems of autonomous vehicle management system 1322. For example, information, localization subsystem 1402 may identify where the ego vehicle is positioned with respect to a map of the environment, such as a city map (also referred to as map management).

Localization subsystem 1402 may also be configured to perform map matching, where what localization subsystem 1402 perceives is matched with the information that it has. Map matching can match recorded geographic coordinates to a logical model of the real world, (e.g., using a Geographic Information System (GPS), etc.). In one example, a map matching algorithm can obtain recorded, serial location points (e.g. from GPS) and relate them to edges in an existing street graph (e.g., as a network). This can be in a sorted list representing the travel of an autonomous vehicle. As part of map matching, localization subsystem 1402 is tracking the ego vehicle in its environment and deducing its position based on what localization subsystem 1402 sees relative to a map, such as a real world map.

Localization subsystem 1402 is also configured to perform visual odometry, which involves determining the orientation and position of the ego vehicle based upon sensor data, such as by analyzing images captured by one or more cameras.

Localization subsystem 1402 may also perform dead reckoning processing. Dead reckoning is the process of calculating one's current position by using a previously determined position, or fix, and advancing that position based upon known or estimated speeds over elapsed time and course. This may involve calculating the ego vehicle's position by estimating the direction and distance travelled. For example, autonomous vehicle management system 1322 receives and knows certain information about autonomous vehicle 1300 such as it wheel speed, steering angle, where autonomous vehicle 1300 was a second ago, and the like. Based on the past position information and in combination with speed/steering angle etc., localization subsystem 1402 can determine the vehicle's next location or current location. This provides local understanding of the ego vehicle's position as it moves on its path. A path can be a road, highway, rail system, runway, boat route, bike path, etc., according to various embodiments.

Localization subsystem 1402 may also perform local history management tracking, where historical information about the ego vehicle's path is analyzed and compared to the current path. For example, if autonomous vehicle 1300 drives around a certain path many number of times, this information can be compared and analyzed by localization subsystem 1402.

Localization subsystem 1402 may also implement a consistency module that is configured to perform rationality checks, deficiency checks, normalize sensor data, etc. For example, localization subsystem 1402 may receive information from different sources of information regarding the ego vehicle's position, location, etc. A rationality check may be used to do a validity check to make sure information from various sensors is consistent and robust. This helps reduce erroneous results. The rationality check can include tests to evaluate whether a sensor data value and/or the result of a calculation can possibly be true. The sensor data received from sensors 1310 can also be normalized and the normalized sensor data then provided to localization subsystem 1402. Localization subsystem 1402 can then utilize the normalized sensor data to generate and/or update the consistent internal map of the real-time (e.g. assuming networking and processing latencies, et.) environment of the autonomous vehicle.

Perception subsystem 1404, periodically or on-demand, receives sensor data from sensors 1310 and builds and maintains a consistent internal map based upon the received information. Perception subsystem 1404 may also receive inputs from other sources, such as from localization subsystem 1402, and use the received inputs to build and maintain the internal map. The internal map generated by perception subsystem 1404 contains all the information including the ego vehicle's information, state of the ego vehicle and its environment, information about objects in the ego vehicle's environment (e.g., information regarding dynamic and static objects around ego vehicle). A consistent internal map can be a localized map of sensed entities/objects in the autonomous vehicle's environment, for example, around the autonomous vehicle. In certain embodiments, these sensed entities/objects are mapped in three dimensions (3D). In certain embodiments, perception subsystem 1404 receives position information from localization subsystem 1402 and incorporates the position information in the internal map. The internal map can be maintained even in the event that a sensor falls offline.

Rationality checks and normalization may be performed on the sensor data received by perception subsystem 1404. These checks can include tests to evaluate whether a sensor data value and/or the result of a calculation can possibly be true. The sensor data received from sensors 1310 can also be normalized and the normalized sensor data then provided to perception subsystem 1404. Perception subsystem 1404 can then utilize the normalized sensor data to generate and/or update the consistent internal map of the real-time environment of the autonomous vehicle.

Perception subsystem 1404 may use various different algorithms and techniques to perform its functions, including artificial intelligence (AI) and machine learning based techniques. For example, perception subsystem 1404 may use a convolutional neural network (CNN) to perform object detection and object classification based upon the sensor data. During a training phase, the CNN may be trained using labeled training data comprising sample images of a vehicle's environment and corresponding ground truth classifications. Labeled data generally includes a group of samples that have been tagged with one or more labels, where the labels represent known results (e.g., ground truth classification, etc.) for the training input samples. Labeling can also be used to take a set of unlabeled data and augment each piece of that unlabeled data with meaningful tags that are informative. A CNN model or other AI/machine learning model built based upon training may then be used in real time to identify and classify objects in the environment of autonomous vehicle 1300 based upon new sensor data received from sensors 1310.

Planning subsystem 1406 is configured to generate a plan of action for autonomous vehicle 1300. The plan may comprise one or more planned actions or operations to be performed by autonomous vehicle 1300. For example, the plan may comprise information identifying a trajectory or path to be traversed by autonomous vehicle 1300. A path can be a road, highway, rail system, runway, boat route, bike path, etc., according to various embodiments. For example, the trajectory information may indicate how the vehicle should move from point A to point B with a list of points between point A and point B marking a trajectory for the vehicle to follow from point A to point B. As another example, the plan generated by planning subsystem 1406 may include planned actions with respect to accessories of autonomous vehicle 1300, such as turning indicators or lights on or off, producing one or more sounds (e.g., alarms), and the like. After a plan of action has been generated, planning subsystem 1406 may communicate the plan of action to controls subsystem 1408, which may then control one or more systems of vehicle systems 1314 to cause the planned actions in the plan of action to be performed in a safe manner by autonomous vehicle 1300.

In addition to the internal map generated by perception subsystem 1404, planning subsystem 1406 may also receive various other inputs that it uses in generating the plan of action for autonomous vehicle 1300. These inputs may include, without limitation: (a) Position or localization information received from localization subsystem 1402. (b) Information identifying one or more goals of autonomous vehicle 1300 (e.g., information may be received identifying a final goal of autonomous vehicle 1300 to make a right turn). The goal may be set by an end user or operator of the autonomous vehicle or machine. For an automotive example, the user may set a high level to drive from the current location of autonomous vehicle 1300 to a particular final destination. Autonomous vehicle 1300 may determine a GPS route plan based upon the current and final destination locations and with a goal to autonomously drive from the current location to the final destination according to the GPS route plan. In general, one or more different goals may be provided. Examples of categories of goals (some of which may overlap) include, without limitation: goals related to performing an autonomous operation by the autonomous vehicle (e.g., autonomous driving or navigation along a path), goals related to maneuvering the vehicle, goals related to interaction of the vehicle with various actors, objects, etc. in the vehicle's environment, goals related to the general operations of the vehicles, and the like. Examples of goals: changing lanes, driving from one location to another location, driving to a destination as fast as possible, making a turn, performing a series of steps in a sequence, and others. (c) High level route information regarding the path or route to be taken by autonomous vehicle 1300. This may be provided directly or indirectly by an end user or operator of the autonomous vehicle. (d) Information identifying safety considerations. These may also be provided to the autonomous vehicle by an end user/operator, etc. using APIs provided by autonomous vehicle 1300 or via metadata configured for autonomous vehicle 1300. Examples of these considerations include, without limitation: always stay within the lane, maintain certain distance from any object at all time, a bus is not to make more than a 30 degree turn, etc. (e) Information about how a particular operation was performed in the past. For example, for a particular autonomous vehicle, this could be the past history of how that particular autonomous vehicle performed the operation in the past, how a different autonomous vehicle performed the operation in the past, how the operation was manually performed using a vehicle in the past (e.g., how a driver/operator performed the operation in the past with the vehicle operating under the driver/operator's control). (f) Other inputs.

Based upon the one or more inputs, planning subsystem 1406 generates a plan of action for autonomous vehicle 1300. Planning subsystem 1406 may update the plan on a periodic basis as the environment of autonomous vehicle 1300 changes, as the goals to be performed by autonomous vehicle 1300 change, or in general, responsive to changes in any of the inputs to planning subsystem 1406.

As part of generating and updating the plan of action, planning subsystem 1406 makes various decisions regarding which actions to include in the plan in order to achieve a particular goal in a safe manner. Processing performed by planning subsystem 1406 as part of making these decisions may include behavior planning, global planning, path planning, fail-safe path, path history tracking, etc.

Planning subsystem 1406 may use various AI-based machine-learning algorithms to generate and update the plan of action in order to achieve the goal of performing a function or operation (e.g., autonomous driving or navigation, digging of an area) to be performed by autonomous vehicle 1300 in a safe manner. For example, in certain embodiments, planning subsystem 1406 may use a model trained using reinforcement learning (RL) for generating and updating the plan of action. Autonomous vehicle management system 1322 may use an RL model to select actions to be performed for controlling an autonomous operation of autonomous vehicle 1300. The RL model may be periodically updated to increase its coverage and accuracy. Reinforcement learning (RL) is an area of machine learning inspired by behaviorist psychology, concerned with how agents ought to take actions in an environment so as to maximize some notion of cumulative reward.

In certain embodiments, in addition to generating a plan of action, planning subsystem 1406 is capable of dynamically controlling the behavior of sensors 1310. For example, planning subsystem 1406 can send instructions or commands to a particular sensor from sensors 1310 to dynamically control the sensor data that is captured by the particular sensor and/or control the sensor data that is communicated from the sensor to perception subsystem 1404 (or to other subsystems of autonomous vehicle management system 1322, such as to localization subsystem 1402). Since the internal map built by perception subsystem 1404 is based upon the sensor data received by perception subsystem 1404 from the sensors, by being able to dynamically control the sensor data received from the sensors, the information included in and/or used by perception subsystem 1404 to build and maintain the internal map can also be dynamically controlled by planning subsystem 1406. Planning subsystem 1406 can dynamically and on-demand direct sensors 1310 to obtain specific types of information or behave in specified manners, for example, to provide additional sensor data to update the consistent internal map. For example, planning subsystem 1406 can command a LIDAR sensor to narrow its range of sensing from a three-hundred and sixty-degree (360°) view to a narrower range that includes a specific object to be sensed and/or tracked in greater detail by the LIDAR system. In this way, the consistent internal map is updated based on feedback from and under the control of planning subsystem 706.

Autonomous vehicle management system 1322 provides an infrastructure that enables planning subsystem 1406 (or other subsystems of autonomous vehicle management system 1318) to send one or more instructions or commands to one or more sensors to control the behavior of those one or more sensors. In the embodiment depicted in FIG. 14, sensors interface subsystem 1410 provides an interface for interacting with sensors 1310. In the outbound direction (from autonomous vehicle management system 1322 to the sensors direction), planning subsystem 1406 can send an instruction or command to sensors interface subsystem 1410. Sensors interface subsystem 1410 is then configured to communicate the received instruction to the intended destination sensor. In the inbound direction (from a sensor to autonomous vehicle management system 1318), sensors interface subsystem 1410 may receive sensor data from a sensor in response to the instruction sent from planning subsystem 1406. Sensors interface subsystem 1410 may then communicate the received sensor data to planning subsystem 1406 (or to the appropriate subsystem of autonomous vehicle management system 1322 which originated the instruction).

Sensors interface subsystem 1410 may be capable of communicating with different sensors using one or more different communication protocols. In certain embodiments, in the outbound direction, for an instruction or command received from planning subsystem 1406 (or from any other subsystem of autonomous vehicle management system 1322) and to be sent to a particular sensor, sensors interface subsystem 1410 may translate the instruction to a format that is understandable by and appropriate for communicating with that particular sensor and then use a particular communication protocol that is applicable for that particular sensor.

In certain embodiments, autonomous vehicle management system 1322 may have access to information identifying sensors 1310 and their capabilities. The subsystems of autonomous vehicle management system 1322 may then access and use this stored information to determine the possible capabilities and behaviors of a sensor and to send instructions to that sensor to change its behavior. In certain embodiments, a sensor has to be registered with autonomous vehicle management system 1322 before communications that enables between the sensor and autonomous vehicle management system 1322. As part of the registration process, for a sensor being registered, information related to the sensor may be provided. This information may include information identifying the sensor, the sensor's sensing capabilities and behaviors, communication protocol(s) usable by the sensor, and other information related to the sensor. Autonomous vehicle management system 1322 may then use this information to communicate with and control the behavior of the sensor.

As indicated above, planning subsystem 1406 may send instructions to a sensor to control and change the sensor's behavior. Changes in a sensor's behavior can include changing the sensor data that is communicated from the sensor to autonomous vehicle management system 1322 (e.g. the sensor data communicated from the sensor to perception subsystem 1404, or other subsystems of autonomous vehicle management system 1322), changing the data that is collected or sensed by the sensor, or combinations thereof. For example, changing the sensor data that is communicated from the sensor to autonomous vehicle management system 1322 can include communicating more or less data than what was communicated from the sensor to autonomous vehicle management system 1322 prior to receiving the instruction, and/or changing the type of sensor data that is communicated from the sensor to autonomous vehicle management system 1322. In some instances, the data sensed or collected by the sensor may remain the same but the sensor data communicated from the sensor to autonomous vehicle management system 1322 may change. In other instances, the data sensed or collected by the sensor may itself be changed in response to an instruction received from autonomous vehicle management system 1322. Planning subsystem 1406 may also be able to turn a sensor on or off by sending appropriate instructions to the sensor.

For example, planning subsystem 1406 may receive inputs including a current internal map generated by perception subsystem 1404, position information from localization subsystem 1402, and a goal that autonomous vehicle 1300 is to make a turn in a certain amount of time (e.g., a right turn in the next 5 seconds). As part of deciding what is the best set of actions to be taken by autonomous vehicle 1300 to achieve the goal in a safe manner, planning subsystem 706 may determine that it needs particular sensor data (e.g., additional images) showing the environment on the right side of autonomous vehicle 1300. Planning subsystem 1406 may then determine the one or more sensors (e.g., cameras) that are capable of providing the particular sensor data (e.g., images of the environment on the right side of autonomous vehicle 1300). Planning subsystem 1406 may then send instructions to these one or more sensors to cause them to change their behavior such that the one or more sensors capture and communicate the particular sensor data to autonomous vehicle management system 1322 (e.g., to perception subsystem 1404). Perception subsystem 1404 may use this specific sensor data to update the internal map. The updated internal map may then be used by planning subsystem 1406 to make decisions regarding the appropriate actions to be included in the plan of action for autonomous vehicle 1300. After the right turn has been successfully made by autonomous vehicle 1300, planning subsystem 1406 may send another instruction instructing the same camera(s) to go back to communicating a different, possibly reduced, level of sensor data to autonomous vehicle management system 1322. In this manner, the sensor data that is used to build the internal map can be dynamically changed.

Examples of changes in a sensor's behavior caused by an instruction received by the sensor from autonomous vehicle management system 1322 may include, without limitation:

Cause a sensor to reduce, or even shut off, sensor data that is communicated from the sensor to autonomous vehicle management system 1322. This may be done, for example, to reduce the high volume of sensor data received by autonomous vehicle management system 1322. Using the same example from above, where planning subsystem 1306 receives an input indicating that a goal of the autonomous vehicle 1300 is to make a right turn, planning subsystem 1406 may decide that it requires reduced sensor data with respect to the left environment of autonomous vehicle 1300. Planning subsystem 1406 may then determine the one or more sensors (e.g., cameras) that are responsible for communicating the sensor data that is to be reduced. Planning subsystem 1406 may then send instructions to these one or more sensors to cause them to change their behavior such that the amount of sensor data communicated from these sensors to autonomous vehicle management system 1322 (e.g., to perception subsystem 1404) is reduced. As an example, the instructions sent from the planning subsystem 1406 may do one or more of the following:

- Cause a sensor to change its field of view. For example, causing a camera or a LIDAR sensor to zoom in to a narrow location.
- Cause a sensor to only send partial information. For example, the sensor may send less than all the information captured by the sensor.
- Cause a sensor to send information faster or slower than before or than a regular rate.
- Cause a sensor to turn on.
- Cause a sensor to capture and/or send information to autonomous vehicle management system 1318 at a different resolution or granularity than before.

Figure 15:
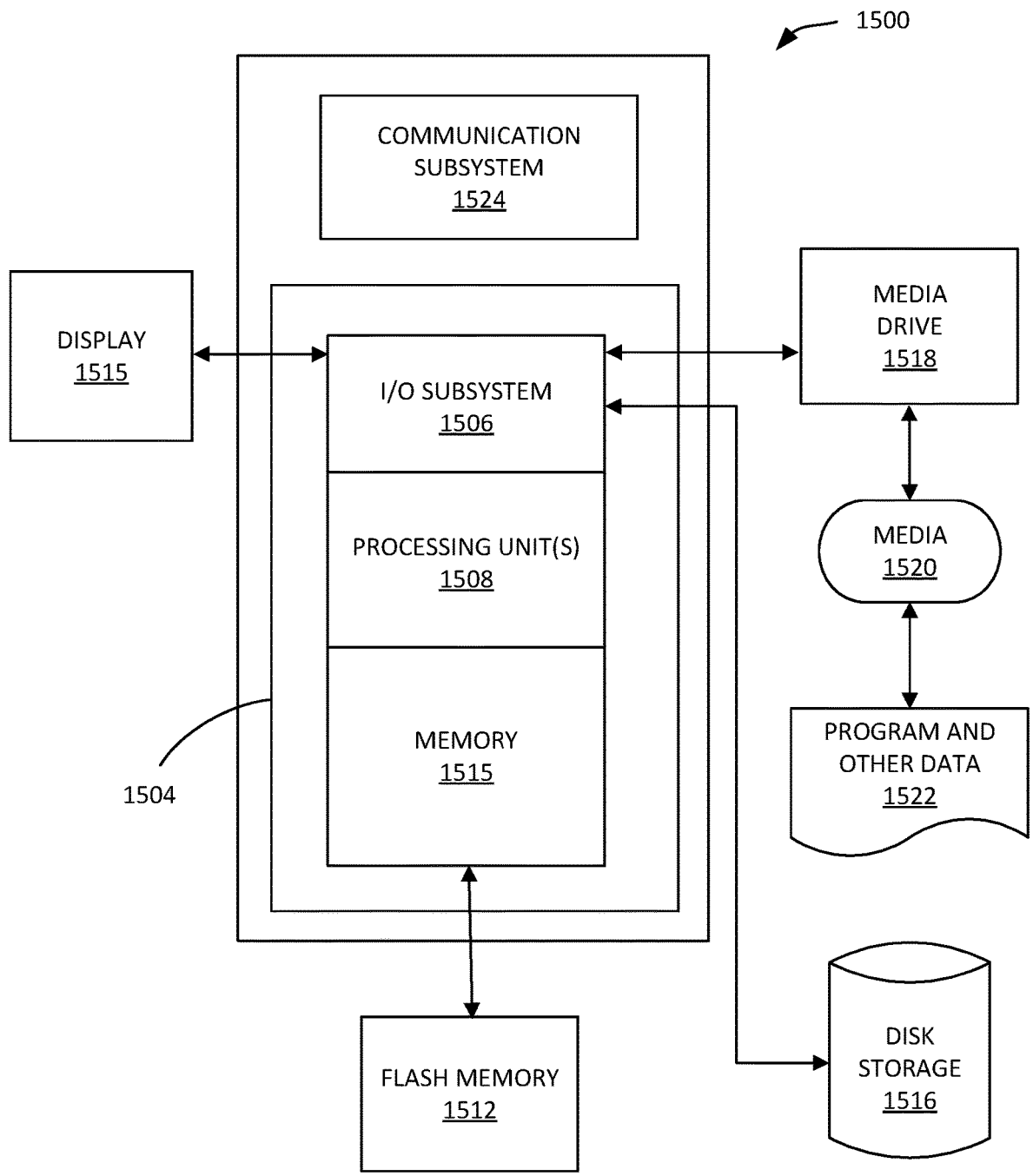
FIG. 15 depicts a simplified block diagram of an exemplary computing system that can be used to implement one or more of the systems and subsystems of the AM, according to certain embodiments.

FIG. 15 depicts a simplified block diagram of an exemplary computing system 1500 that can be used to implement one or more of the systems and subsystems described in this disclosure and/or to perform any one of the processes or methods described herein. For example, in embodiments where systems and subsystems described above (e.g., FMS 102, AMS 226, autonomous vehicle management system 1322) are implemented in software, in certain embodiments, the software may be executed by a computing system such as computing system 1500 depicted in FIG. 15 or a variant thereof. Computing system 1500 may include, for example, a processor, memory, storage, and I/O devices (e.g., a monitor, a keyboard, a disk drive, an Internet connection, etc.). In some instances, computing system 1500 may also include other components, circuitry, or other specialized hardware for carrying out specialized functions.

In some operational settings, computing system 1500 may be configured as a system that includes one or more units, each of which is configured to carry out some aspects of the processes either in software only, hardware only, or some combination thereof. Computing system 1500 can be configured to include additional systems in order to fulfill various functionalities.

As depicted in embodiment in FIG. 15, computing system 1500 includes one or more processing units 1508, a set of memories (including system memory 1515, computer-readable media 1520, and disk storage 1516), and an I/O subsystem 1506. These components may be communicatively coupled to each other via a bus subsystem that provides a mechanism for the various systems and subsystems of computing system 1500 to communicate with each other as intended. The bus subsystem can be any of several types of bus structures including a memory bus or memory controller, a peripheral bus, a local bus using any of a variety of bus architectures, and the like. In some embodiments, components 1506, 1508 and 1510 may be located on a motherboard 1504.

Processing units 1508 may include one or more processors. The processors may be single or multicore processors. Processor units 1508 can also be implemented using customized circuits, such as application specific integrated circuits (ASICs), or field programmable gate arrays (FPGAs). The processors are configured to execute instructions (e.g., programs, code, etc.) stored in the various memories, such as in system memory 1510, on computer readable storage media 1520, or on disk 1516. The programs or processes may be executed sequentially or in parallel. In certain embodiments, computing system 1500 may provide a virtualized computing environment executing one or more virtual machines. In such embodiments, one or more processors or cores of processors may be allocated to each virtual machine. In some embodiments, a processing unit 1508 may include special purpose co-processors such as graphics processors (GPUs), digital signal processors (DSPs), or the like.

The set of memories can include one or more non-transitory memory devices, including volatile and non-volatile memory devices. Software (programs, code modules, instructions) that, when executed by one or more processors of the processing unit(s) 1508 provide the functionality described herein, may be stored in one or more of the memories. Flash memory 1512 may also be included in certain embodiments. System memory 1510 may include a number of memories including a volatile main random access memory (RAM) (e.g., static random access memory (SRAM), dynamic random access memory (DRAM), and the like) for storage of instructions and data during program execution and a non-volatile read only memory (ROM) or flash memory in which fixed instructions are stored. In some implementations, a basic input/output system (BIOS), containing the basic routines that help to transfer information between elements within computer system 1500, such as during start-up, may typically be stored in the ROM. The RAM typically contains data and/or program modules that are presently being operated and executed by the processing unit(s) 1508.

Executable code, program instructions, applications, and program data may be loaded into system memory 1510 and executed by one or more processors of processing unit(s) 1508. One or more operating systems may also be loaded into system memory 1510. Examples of operating systems include, without limitation, different versions of Microsoft Windows®, Apple Macintosh®, Linux operating systems, and/or mobile operating systems such as iOS, Windows® Phone, Android® OS, BlackBerry® OS, Palm® OS operating systems, and others.

In certain embodiments, programming modules and instructions, data structures, and other data (collectively 1522) that are used to provide the functionality of some embodiments may be stored on computer-readable media 1520. A media drive 1518 connected to computing system 1500 may be provided for reading information from and/or writing information to computer-readable media 1520. Computer-readable media 1520 may include non-volatile memory such as a magnetic disk drive, an optical disk drive such as a CD ROM, DVD, a Blu-Ray® disk, or other optical media, Zip® drives, various types of memory cards and drives (e.g., a USB flash drive, SD cards), DVD disks, digital video tape, solid-state drives (SSD), and the like.

I/O subsystem 1506 may include devices and mechanisms for inputting information to computing system 1500 and/or for outputting information from or via computing system 1500. In general, use of the term input device is intended to include all possible types of devices and mechanisms for inputting information to computing system 1500. Input mechanisms may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, cameras, digital camcorders, portable media players, webcams, image scanners, fingerprint scanners, barcode readers, and the like. In general, use of the term output device is intended to include all possible types of devices and mechanisms for outputting information from computing system 1500 to a user or other computer. Such output devices may include one or more types of displays, indicator lights, or non-visual displays such as audio output devices, printers, speakers, headphones, voice output devices, etc. I/O subsystem 1506 may also include interfaces to input and/or output devices external to the I/O subsystem 1506, such as a display 1510.

Computing system 1500 may include a communications subsystem 1524 that provides an interface for computing system 1500 to communicate (e.g., receive data, send data) with other computer systems and networks. Communication subsystem 1524 may support both wired and/or wireless communication protocols. For example, communication subsystem 1524 may enable computing system 1500 to be communicatively coupled with remote sensors, with a network such as the Internet, and the like. Various different communication protocols and formats may be used for the communications such Wi-Fi, Bluetooth® (and/or other standards for exchanging data over short distances includes those using short-wavelength radio transmissions), USB, Ethernet, cellular, an ultrasonic local area communication protocol, etc.

Computing system 1500 can be one of various types, including a mobile device (e.g., a cellphone, a tablet, a PDA, etc.), a personal computer, a workstation, or any other data processing system. Due to the ever-changing nature of computers and networks, the description of computer system 1500 depicted in FIG. 15 is intended only as a specific example. Many other configurations having more or fewer components than the system depicted in FIG. 15 are possible.

At least some values based on the results of the above-described processes can be saved for subsequent use. Additionally, a computer-readable medium can be used to store (e.g., tangibly embody) one or more computer programs for performing any one of the above-described processes by means of a computer. The computer program may be written, for example, in a general-purpose programming language (e.g., Pascal, C, C++, Java, Python) and/or some specialized application-specific language (PHP, JavaScript, XML). It is noted that JavaScript has been used as an example in several embodiments. However, in other embodiments, another scripting language and/or JavaScript variants can be utilized as well.

The described features, structures, or characteristics of described in this disclosure may be combined in any suitable manner in one or more embodiments. In the description herein, numerous specific details are provided, such as examples of programming, software modules, user selections, network transactions, database queries, database structures, hardware modules, hardware circuits, hardware chips, etc., to provide a thorough understanding of various embodiments. One skilled in the relevant art will recognize, however, that the features may be practiced without one or more of the specific details, or with other methods, components, materials, and so forth. In other instances, well-known structures, materials, or operations are not shown or described in detail to avoid obscuring novel aspects.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flow charts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method comprising:
receiving, by a plurality of automated machines (AMs), information regarding a task to be performed, wherein the information is received from a fleet management system (FMS) configured to manage the plurality of automated machines (AMs) located on a site, the plurality of AMs including a first AM;
identifying, by the first AM, a set of subtasks corresponding to the task to be performed; and
autonomously performing, by the first AM, one or more subtasks from the set of subtasks, wherein the set of subtasks includes at least one subtask that is not included in the one or more subtasks performed by the first AM, wherein the performing comprises communicating by the first AM with another AM in the plurality of AMs without involving the FMS.

2. The method of claim 1, further comprising:
identifying, by the first AM, a set of unit tasks to be performed by the first AM corresponding to at least one subtask of the one or more subtasks, the set of unit tasks includes a first unit task that when executed by the first AM causes the first AM to communicate with the another AM in the plurality of AMs; and
wherein the performing comprises executing, by the first AM, the set of unit tasks corresponding to the first subtask.

3. The method of claim 2, wherein executing the set of unit tasks comprises:
identifying, by the first AM, a sequence for executing the set of unit tasks; and
executing, by the first AM, the set of unit tasks in accordance with the sequence.

4. The method of claim 2, wherein executing the set of unit tasks comprises:
executing the first unit task causing the first AM to communicate with the another AM independent of the FMS.

5. The method of claim 2, wherein executing, by the first AM, the set of unit tasks further comprises, communicating by the first AM to the another AM in the plurality of AMs an update to the set of unit tasks executed by the first AM.

6. The method of claim 1, wherein the first AM is identified as a master AM, the method further comprising:
receiving, by the first AM from the FMS, information identifying a set of AMs in the plurality of AMs for performing the task; and
communicating, by the first AM, the information regarding the task to other AMs in the set of AMs.

7. The method of claim 6, further comprising:
receiving, by the first AM from a second AM in the set of AMs, information indicative of a status of the second subtask performed by the second AM corresponding to the task; and
communicating, by the first AM to the FMS, the information received by the first AM from the second AM.

8. The method of claim 6, wherein:
the first AM receives the information regarding the task to be performed and information identifying the set of AMs for performing the task when located at a first location on the site, wherein, when in the first location, the first AM is able to receive communications from the FMS;
wherein communicating, by the first AM, the information regarding the task to other AMs in the set of AMs comprises:
the first AM autonomously moving from the first location to a second location on the site, wherein, when in the second location, the first AM is able to communicate with the other AMs in the set of AMs; and
communicating, by the first AM, the information regarding the task to the other AMs in the set of AMs, from the second location.

9. The method of claim 8, wherein:
the first AM is an autonomous vehicle; and
the first AM autonomously moving from the first location to the second location comprises autonomously navigating a path by the first AM from the first location to the second location.

10. A method comprising:
determining, by a control system configured to manage a plurality of automated machines (AMs), a set of one or more tasks to be performed;
determining, by the control system, an expected time of completion for each task in the set of one or more tasks;
identifying, by the control system, a set of one or more AMs from the plurality of AMs to be allocated for performing the set of one or more tasks, wherein the identifying comprises identifying the set of AMs based on the expected time of completion determined for each task in the set of one or more tasks and a number of trips between two locations to be made to execute at least one task in the set of one or more tasks; and
communicating, by the control system, information related to the set of tasks to the set of one or more AMs.

11. The method of claim 10, wherein identifying the set of one or more AMs to be allocated for performing the set of one or more tasks comprises:
determining, by the control system, an availability of each AM in the set of AMs during a period of time to perform the set of one or more tasks.

12. The method of claim 11, wherein identifying the set of one or more AMs to be allocated for performing the set of one or more tasks comprises:
using, by the control system, an optimization technique to determine a particular allocation of the set of AMs for performing the set of one or more tasks, wherein, for a first task in the set of tasks, the particular allocation identifies a first subset of AMs from the set of one or more AMs for performing the first task.

13. The method of claim 11, further comprising:
allocating, by the control system, the set of AMs to execute the set of tasks based at least in part on the expected time of completion of each task in the set of one or more tasks and a total amount of time taken to execute the number of trips for at least one task in the set of one or more tasks.

14. The method of claim 13, wherein the number of trips is further is determined based on a total amount of time taken by an AM in the set of AMs to execute the at least one task from the set of tasks.

15. A system comprising:
a memory storing information indicative of a set of tasks to be executed; and one or more processors configured to perform processing comprising:

receiving, by a plurality of automated machines (AMs), information regarding a task to be performed, wherein the information is received from a fleet management system (FMS) configured to manage the plurality of automated machines (AMs) located on a site, the plurality of AMs including a first AM;

identifying, by the first AM, a set of subtasks corresponding to the task to be performed; and autonomously performing, by the first AM, one or more subtasks from the set of subtasks, wherein the set of subtasks includes at least one subtask that is not included in the one or more subtasks performed by the first AM, wherein the performing comprises communicating by the first AM with another AM in the set of AMs without involving the FMS.

16. The system of claim 15, wherein the processing further comprises:

identifying, by the first AM, a set of unit tasks to be performed by the first AM corresponding to at least one subtask of the one or more subtasks, the set of unit tasks includes a first unit task that when executed by the first AM causes the first AM to communicate with the another AM; and wherein the performing comprises executing, by the first AM, the set of unit tasks corresponding to the subtask.

17. The system of claim 16, wherein the processing for executing the set of unit tasks comprises:

identifying, by the first AM, a sequence for executing the set of unit tasks; and executing, by the first AM, the set of unit tasks in accordance with the sequence.

18. The system of claim 17, wherein the processing for executing the set of unit tasks further comprises:

communicating by the first AM to the another AM in the plurality of AMs an update to the set of unit tasks executed by the first AM.

19. The system of claim 17, wherein the first AM is identified as a master AM and the processing further comprises:

receiving, by the first AM from the FMS, information identifying a set of AMs in the plurality of AMs for performing the task; and communicating, by the first AM, the information regarding the task to other AMs in the set of AMs.

20. The system of claim 19, further comprising:

receiving, by the first AM from a second AM in the set of AMs, information indicative of a status of the second subtask performed by the second AM corresponding to the task; and communicating, by the first AM to the FMS, the information received by the first AM from the second AM.

21. The method of claim 1, wherein receiving, by the plurality of AMs further comprises:

receiving, by the second AM in the plurality of AMs, information regarding the task to be performed;

identifying, by the second AM, the set of subtasks corresponding to the task to be performed; and autonomously performing, by the second AM, one or more subtasks from the set of subtasks, wherein the set of subtasks includes at least one subtask that is not included in the one or more subtasks performed by the first AM, wherein the performing comprises communicating by the second AM with a third AM in the plurality of AMs without involving the FMS.

* * * * *